(12) United States Patent
Geng et al.

(10) Patent No.: US 11,686,969 B2
(45) Date of Patent: Jun. 27, 2023

(54) COLOR FILTER SUBSTRATE, DISPLAY, AND TERMINAL

(71) Applicant: HONOR DEVICE CO., LTD., Shenzhen (CN)

(72) Inventors: Chuanbin Geng, Shenzhen (CN); Guangnan Xiao, Shenzhen (CN); Wenbing Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/368,552

(22) Filed: Jul. 6, 2021

(65) Prior Publication Data

US 2021/0333621 A1 Oct. 28, 2021

Related U.S. Application Data

(63) Continuation of application No. 16/651,668, filed as application No. PCT/CN2017/110275 on Nov. 9, 2017, now Pat. No. 11,073,720.

(30) Foreign Application Priority Data

Sep. 28, 2017 (CN) .......................... 201710902737.6

(51) Int. Cl.
  *G02F 1/1362* (2006.01)
  *G02F 1/1335* (2006.01)
  *G09F 9/302* (2006.01)

(52) U.S. Cl.
  CPC .. *G02F 1/133514* (2013.01); *G02F 1/133512* (2013.01); *G09F 9/302* (2013.01); *G02F 2203/30* (2013.01)

(58) Field of Classification Search
  CPC ................................................. G02F 1/133514
  See application file for complete search history.

(56) References Cited

U.S. PATENT DOCUMENTS

7,843,414 B2 11/2010 Hsu et al.
10,643,577 B2 5/2020 Nakamura et al.
(Continued)

FOREIGN PATENT DOCUMENTS

CN  105185815 A  12/2015
CN  105511152 A   4/2016
(Continued)

OTHER PUBLICATIONS

Yafei Huo, "QT Creator Quick Start Second Edition", dated Jan. 31, 2014, 23 pages.

*Primary Examiner* — Sang V Nguyen
(74) *Attorney, Agent, or Firm* — Womble Bond Dickinson (US) LLP

(57) ABSTRACT

A jagged display effect may be ameliorated by processing an edge of the display into an arc shape, thereby improving display quality. Display units in the color filter substrate are in a one-to-one correspondence with pixel units in the display. A plurality of display units corresponding to a corner area of the display include a ribbon area including K display units. A target boundary line that is of the ribbon area and that is away from the center of the color filter substrate is jagged, and K≥2. In the ribbon area, a light transmittance of a first display unit close to the target boundary line is less than a light transmittance of a second display unit away from the target boundary line. The ribbon area comprises Q transition layers disposed along the target boundary line.

21 Claims, 22 Drawing Sheets

(56) References Cited

U.S. PATENT DOCUMENTS

| | | | |
|---|---|---|---|
| 2016/0120005 A1 | 4/2016 | Wu et al. | |
| 2018/0012566 A1 | 1/2018 | Lin et al. | |
| 2018/0151612 A1 | 5/2018 | Zheng et al. | |
| 2018/0337217 A1 | 11/2018 | Zang et al. | |
| 2018/0357979 A1* | 12/2018 | Nakamura | G09G 3/2003 |
| 2019/0088188 A1* | 3/2019 | Zheng | G02F 1/133707 |
| 2019/0094428 A1* | 3/2019 | Feng | H01L 27/3272 |

FOREIGN PATENT DOCUMENTS

| | | | | |
|---|---|---|---|---|
| CN | 105911744 | * | 8/2016 | G02F 1/1335 |
| CN | 105911744 A | | 8/2016 | |
| CN | 106707606 A | | 5/2017 | |
| CN | 106873224 | * | 6/2017 | G02F 1/1333 |
| CN | 106873224 A | | 6/2017 | |
| CN | 106875328 A | | 6/2017 | |
| CN | 107103893 A | | 8/2017 | |
| CN | 107577078 A | | 1/2018 | |
| JP | 2005070793 A | | 3/2005 | |
| WO | 2017110721 A1 | | 6/2017 | |

* cited by examiner

☐ Display unit

| | | | | | | | | | | | | |
|---|---|---|---|---|---|---|---|---|---|---|---|---|
| 232 | 255 | 255 | 255 | 255 | 255 | 255 | 255 | 255 | 255 | 255 | 255 | 255 |
| 192 | 255 | 255 | 255 | 255 | 255 | 255 | 255 | 255 | 255 | 255 | 255 | 255 |
| 151 | 255 | 255 | 255 | 255 | 255 | 255 | 255 | 255 | 255 | 255 | 255 | 255 |
| 121 | 255 | 255 | 255 | 255 | 255 | 255 | 255 | 255 | 255 | 255 | 255 | 255 |
| 63 | 255 | 255 | 255 | 255 | 255 | 255 | 255 | 255 | 255 | 255 | 255 | 255 |
| 0 | 255 | 255 | 255 | 255 | 255 | 255 | 255 | 255 | 255 | 255 | 255 | 255 |
| 0 | 220 | 255 | 255 | 255 | 255 | 255 | 255 | 255 | 255 | 255 | 255 | 255 |
| 0 | 151 | 255 | 255 | 255 | 255 | 255 | 255 | 255 | 255 | 255 | 255 | 255 |
| 0 | 63 | 151 | 255 | 255 | 255 | 255 | 255 | 255 | 255 | 255 | 255 | 255 |
| 0 | 0 | 63 | 255 | 255 | 255 | 255 | 255 | 255 | 255 | 255 | 255 | 255 |
| 0 | 0 | 63 | 255 | 255 | 255 | 255 | 255 | 255 | 255 | 255 | 255 | 255 |
| 0 | 0 | 0 | 63 | 255 | 255 | 255 | 255 | 255 | 255 | 255 | 255 | 255 |
| 0 | 0 | 0 | 63 | 255 | 255 | 255 | 255 | 255 | 255 | 255 | 255 | 255 |
| 0 | 0 | 0 | 0 | 63 | 255 | 255 | 255 | 255 | 255 | 255 | 255 | 255 |
| 0 | 0 | 0 | 0 | 63 | 151 | 255 | 255 | 255 | 255 | 255 | 255 | 255 |
| 0 | 0 | 0 | 0 | 0 | 63 | 255 | 255 | 255 | 255 | 255 | 255 | 255 |
| 0 | 0 | 0 | 0 | 0 | 0 | 63 | 255 | 255 | 255 | 255 | 255 | 255 |
| 0 | 0 | 0 | 0 | 0 | 0 | 0 | 63 | 255 | 255 | 255 | 255 | 255 |
| 0 | 0 | 0 | 0 | 0 | 0 | 0 | 0 | 63 | 255 | 255 | 255 | 255 |
| 0 | 0 | 0 | 0 | 0 | 0 | 0 | 0 | 0 | 63 | 255 | 255 | 255 |
| 0 | 0 | 0 | 0 | 0 | 0 | 0 | 0 | 0 | 0 | 63 | 151 | 255 |
| 0 | 0 | 0 | 0 | 0 | 0 | 0 | 0 | 0 | 0 | 0 | 63 | 63 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |

Row 1

CONT. FROM FIG. 7A-1

| 255 | 255 | 255 | 255 | 255 | 255 | 255 | 255 | 255 | 255 | 255 | 255 | 255 |
|---|---|---|---|---|---|---|---|---|---|---|---|---|
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 63 | 63 | 255 | 255 | 255 | 255 | 255 | 255 | 255 | 255 | 255 | 255 | 255 |
| 0 | 0 | 63 | 63 | 151 | 255 | 255 | 255 | 255 | 255 | 255 | 255 | 255 |
| 0 | 0 | 0 | 0 | 63 | 63 | 63 | 63 | 151 | 220 | 255 | 255 | 255 |
| 0 | 0 | 0 | 0 | 0 | 0 | 0 | 0 | 63 | 121 | 166 | 191 | 232 |

Row 2

FIG. 7A-2

☐ Display unit

| 232 | 255 | 255 | 255 | 255 | 255 | 255 | 255 | 255 | 255 | 255 | 255 | 255 |
|---|---|---|---|---|---|---|---|---|---|---|---|---|
| 255 | 255 | 255 | 255 | 255 | 255 | 255 | 255 | 255 | 255 | 255 | 255 | 255 |
| 191 | 191 | 191 | 191 | 255 | 255 | 255 | 255 | 255 | 255 | 255 | 255 | 255 |
| 127 | 127 | 127 | 191 | 255 | 255 | 255 | 255 | 255 | 255 | 255 | 255 | 255 |
| 63 | 63 | 127 | 191 | 255 | 255 | 255 | 255 | 255 | 255 | 255 | 255 | 255 |
| 0 | 63 | 127 | 191 | 255 | 255 | 255 | 255 | 255 | 255 | 255 | 255 | 255 |
| 0 | 63 | 127 | 191 | 191 | 255 | 255 | 255 | 255 | 255 | 255 | 255 | 255 |
| 0 | 63 | 127 | 127 | 191 | 255 | 255 | 255 | 255 | 255 | 255 | 255 | 255 |
| 0 | 63 | 63 | 127 | 191 | 191 | 255 | 255 | 255 | 255 | 255 | 255 | 255 |
| 0 | 0 | 63 | 127 | 127 | 191 | 255 | 255 | 255 | 255 | 255 | 255 | 255 |
| 0 | 0 | 63 | 63 | 127 | 191 | 191 | 255 | 255 | 255 | 255 | 255 | 255 |
| 0 | 0 | 0 | 63 | 127 | 127 | 191 | 255 | 255 | 255 | 255 | 255 | 255 |
| 0 | 0 | 0 | 63 | 63 | 127 | 191 | 255 | 255 | 255 | 255 | 255 | 255 |
| 0 | 0 | 0 | 0 | 63 | 127 | 191 | 191 | 191 | 255 | 255 | 255 | 255 |
| 0 | 0 | 0 | 0 | 63 | 127 | 127 | 127 | 191 | 191 | 255 | 255 | 255 |
| 0 | 0 | 0 | 0 | 0 | 63 | 63 | 127 | 127 | 191 | 191 | 255 | 255 |
| 0 | 0 | 0 | 0 | 0 | 0 | 63 | 63 | 127 | 127 | 191 | 191 | 255 |
| 0 | 0 | 0 | 0 | 0 | 0 | 0 | 63 | 63 | 127 | 127 | 191 | 191 |
| 0 | 0 | 0 | 0 | 0 | 0 | 0 | 0 | 63 | 63 | 127 | 127 | 191 |
| 0 | 0 | 0 | 0 | 0 | 0 | 0 | 0 | 0 | 63 | 63 | 127 | 127 |
| 0 | 0 | 0 | 0 | 0 | 0 | 0 | 0 | 0 | 0 | 63 | 63 | 127 |
| 0 | 0 | 0 | 0 | 0 | 0 | 0 | 0 | 0 | 0 | 0 | 63 | 63 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |

CONT. FROM FIG. 9A

| 255 | 255 | 255 | 255 | 255 | 255 | 255 | 255 | 255 | 255 | 255 | 255 | 255 |
|---|---|---|---|---|---|---|---|---|---|---|---|---|
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 191 | 255 | 255 | 255 | 255 | 255 | 255 | 255 | 255 | 255 | 255 | 255 | 255 |
| 191 | 191 | 191 | 255 | 255 | 255 | 255 | 255 | 255 | 255 | 255 | 255 | 255 |
| 127 | 127 | 191 | 191 | 255 | 255 | 255 | 255 | 255 | 255 | 255 | 255 | 255 |
| 63 | 127 | 127 | 191 | 191 | 191 | 191 | 255 | 255 | 255 | 255 | 255 | 255 |
| 63 | 63 | 127 | 127 | 127 | 127 | 191 | 191 | 191 | 191 | 191 | 255 | 255 |
| 0 | 0 | 63 | 63 | 63 | 127 | 127 | 127 | 127 | 127 | 191 | 255 | 255 |
| 0 | 0 | 0 | 0 | 63 | 63 | 63 | 63 | 63 | 127 | 191 | 255 | 255 |
| 0 | 0 | 0 | 0 | 0 | 0 | 0 | 0 | 63 | 127 | 191 | 255 | 255 |

FIG. 9B

☐ Display unit

| 0.9 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|
| 0.74 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0.6 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0.47 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0.25 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0.6 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0.25 | 0.6 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0.25 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0.25 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0.25 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0.25 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0.25 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0.25 | 0.6 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0.25 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0.25 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0.25 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0.25 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0.25 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0.25 | 0.6 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0.25 | 0.25 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0.25 | 0.25 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0.25 | 0.25 | 0.6 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0.25 | 0.25 | 0.25 | 0.25 | 0.6 | 0.85 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0.25 | 0.47 | 0.6 | 0.74 | 0.9 |

FIG. 10

COLOR FILTER SUBSTRATE, DISPLAY, AND TERMINAL

CROSS REFERENCE TO RELATED APPLICATIONS

This application is continuation application of U.S. application Ser. No. 16/651,668, filed on Mar. 27, 2020, which is a national stage of International Application No. PCT/CN2017/110275, filed on Nov. 9, 2017, which claims priority to Chinese Patent Application No. 201710902737.6, filed on Sep. 28, 2017. Both of the aforementioned applications are hereby incorporated by reference in their entireties.

TECHNICAL FIELD

Embodiments of this application relate to the field of display technologies, and in particular, to a color filter substrate, a display, and a terminal.

BACKGROUND

As shown in FIG. 1, to increase a display area of a terminal, for example, a mobile phone and increase a screen-to-body ratio of the mobile phone, many mobile phone vendors have processed corners of a display 11 into an arc shape, so that four vertices of a display area in the display 11 have a softer display effect of a fillet 12.

However, because pixel units arranged in an array in the display 11 are all rectangular, when pixels at a vertex of the display 11 are processed into an arc shape, a detailed view of the fillet 12 is shown in FIG. 2. It can be learned that an edge of the fillet 12 is apparently jagged, which affects user usage experience and in addition, deteriorates display quality.

SUMMARY

Embodiments of this application provide a color filter substrate, a display, and a terminal. A jagged display effect is ameliorated by processing an edge of the display into an arc shape, thereby improving display quality.

To achieve the foregoing objective, the following technical solutions are used in the embodiments of this application.

According to a first aspect, an embodiment of this application provides a color filter substrate. Display units in the color filter substrate are in a one-to-one correspondence with pixel units in a display. The display includes at least one corner area. A plurality of display units corresponding to the corner area include a ribbon area including K (K≥2) display units. A target boundary line that is of the ribbon area and that is away from the center of the color filter substrate is jagged. A first display unit and a second display unit in the ribbon area are used as an example. The second display unit is farther away from the target boundary line than the first display unit, and a light transmittance of the first display unit is less than a light transmittance of the second display unit, where the light transmittance of the first display unit is greater than 0.

In other words, during fabrication of the color filter substrate, dark-to-light gradient processing is performed on a jagged fillet by adjusting light transmittances of display units corresponding to a corner area of the display, so that an arc originally in a rigid jagged shape becomes visually softer and a smoother fillet effect is implemented.

In a possible embodiment, the first display unit and the second display unit are in a same column or a same row of the K display units. In other words, light transmittances of display units in each column (or each row) in the ribbon area along the target boundary line may gradually increase, to implement soft transition of the jagged target boundary line.

In a possible embodiment, the ribbon area includes Q transition layers disposed along the target boundary line, where Q≥2. A display unit at a first transition layer is the first display unit, and a display unit at a second transition layer is the second display unit. The first transition layer is closer to the target boundary line than the second transition layer. In other words, in the ribbon area, gray scale values of display units along the target boundary line smoothly transition from 0 to 255 layer-by-layer.

In a possible embodiment, each of the Q transition layers has a same thickness, so that light transmittances change more evenly, and the ribbon area has a smoother display effect.

In a possible embodiment, display units at any one of the Q transition layers have a same light transmittance. In this case, Q light transmittances corresponding to the Q transition layers may be distributed in an arithmetic progression. Therefore, the jagged target boundary line can present a smoother transition during a display.

In a possible embodiment, the ribbon area further includes a third display unit. The third display unit is farther away from the target boundary line than the second display unit, and a light transmittance of the third display unit is greater than the light transmittance of the second display unit.

In a possible embodiment, in the ribbon area, in any two columns of the display units, a quantity of display units whose light transmittances are any value in (0, 1) in one column is equal or not equal to that in the other column; and/or in any two rows of the display units, a quantity of display units whose light transmittances are any value in (0, 1) in one row is equal or not equal to that in the other row. In other words, a change degree of light transmittances of the display units in the ribbon area may be unevenly set in a direction of each row (or each column).

In a possible embodiment, in a light emitting direction of the color filter substrate, an area ratio of a black matrix to a color block in the first display unit is greater than an area ratio of a black matrix to a color block in the second display unit. When a display unit has a larger area ratio of a black matrix to a color block, the display unit has a smaller light transmittance. In other words, during fabrication of the color filter substrate, a light transmittance of each display unit may be changed through changing of a display area of the display unit.

In a possible embodiment, the black matrix and the color block are disposed at a same layer, or the black matrix covers the color block.

In a possible embodiment, color blocks of different colors in each display unit have a same area, to avoid an abnormal display of colors, because the color blocks of the different colors have different areas, after the different colors are mixed.

In a possible embodiment, in the ribbon area, both a color block and a black matrix in each display unit in each row of the display units are symmetrically disposed along an x axis; and/or both a color block and a black matrix in each display unit in each column of the display units are symmetrically disposed along a y axis, so that color uniformity can be improved in a subsequent display process of the display units.

According to a second aspect, an embodiment of this application provides a display that includes an array substrate, a color filter substrate, and a liquid crystal layer packaged between the array substrate and the color filter substrate. The color filter substrate is the color filter substrate according to any one of the first aspect or the possible design methods.

According to a third aspect, an embodiment of this application provides a terminal that includes a processor, a memory, and the foregoing display. The memory and the display are separately coupled to the processor. The memory is configured to store one or more computer programs, and the processor is configured to execute the one or more computer programs.

In the embodiments of this application, names of components in the display do not constitute a limitation on devices. In actual implementation, these components may have other names. Any component whose function is similar to that in the embodiments of this application falls within the scope defined by the claims and their equivalent technologies of this application.

In addition, for technical effects brought by any design in the second aspect and the third aspect, refer to technical effects brought by different design methods in the foregoing first aspect. Details are not described herein again.

BRIEF DESCRIPTION OF DRAWINGS

FIG. 7A-1 and FIG. 7A-2 are schematic diagrams 3 of an application scenario of displaying a fillet according to an embodiment of this application;

FIG. 9A and FIG. 9B are schematic diagrams 6 of an application scenario of displaying a fillet according to an embodiment of this application;

FIG. 10 is a schematic diagram 7 of an application scenario of displaying a fillet according to an embodiment of this application;

DESCRIPTION OF EMBODIMENTS

The following terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In descriptions of embodiments of this application, unless otherwise stated, "a plurality of" means two or more than two.

A display method provided in an embodiment of this application may be applied to any terminal having a display, such as a mobile phone, a wearable device, an augmented reality (AR) device/a virtual reality (VR) device, a tablet computer, a notebook computer, an ultra-mobile personal computer (UMPC), a netbook, or a personal digital assistant (PDA). Certainly, a specific form of the terminal is not limited in the following embodiments.

Figure 3:
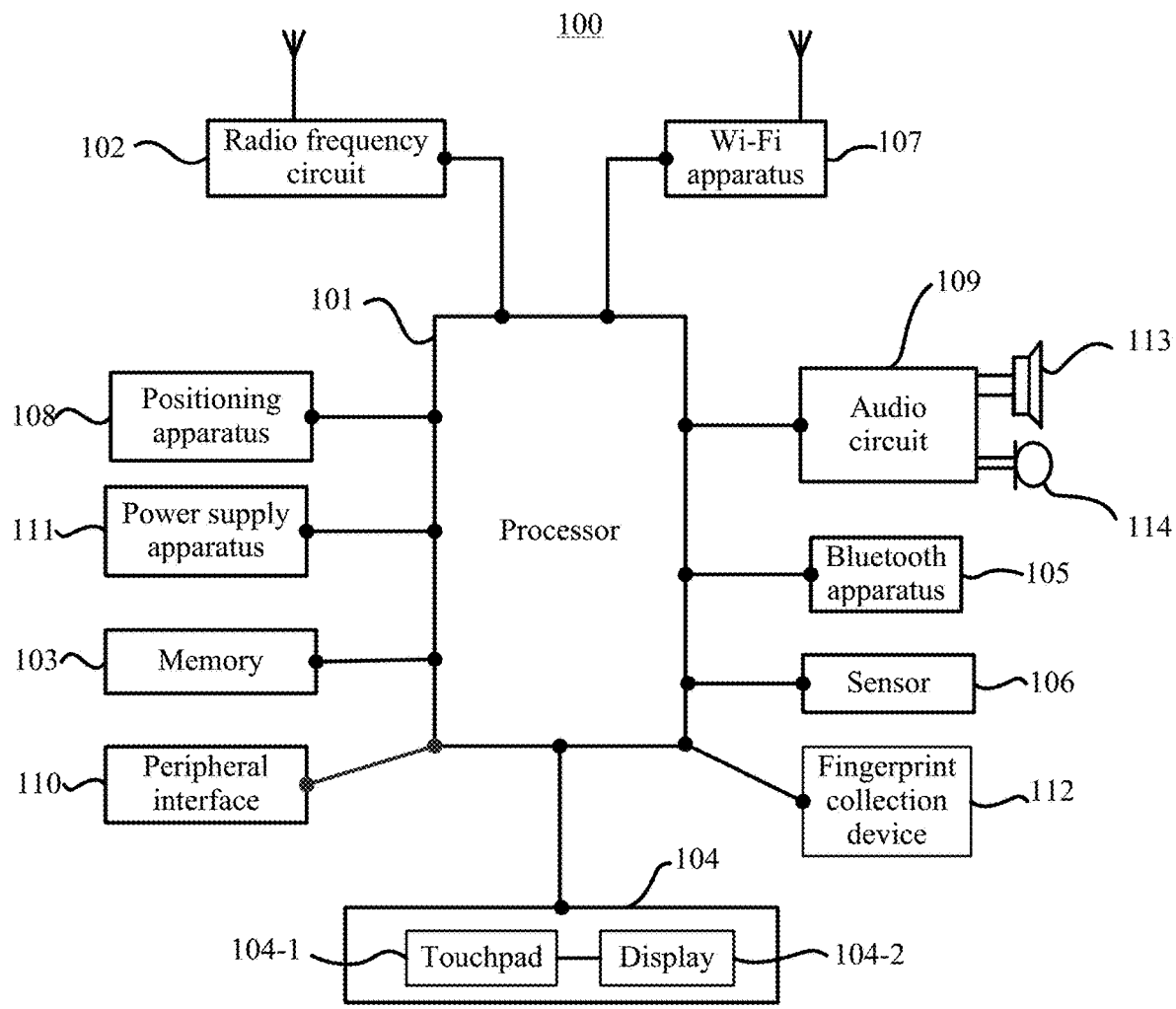
FIG. 3 is a schematic structural diagram of a terminal according to an embodiment of this application.

As shown in FIG. 3, a terminal in an embodiment of this application may be a mobile phone 100. The following describes this embodiment in detail by using the mobile phone 100 as an example. It should be understood that the mobile phone 100 shown in the figure is merely an example of the foregoing terminal, and the mobile phone 100 may have components more or fewer than those shown in the figure, or may have a combination of two or more components, or may have different component configurations.

As shown in FIG. 3, the mobile phone 100 may specifically include components such as a processor 101, a radio frequency (RF) circuit 102, a memory 103, a touchscreen 104, a Bluetooth apparatus 105, one or more sensors 106, a wireless fidelity (Wi-Fi) apparatus 107, a positioning apparatus 108, an audio circuit 109, a peripheral interface 110, and a power supply system 111. These components may perform communication by using one or more communications buses or signal lines (not shown in FIG. 3). A person skilled in the art can understand that a hardware structure shown in FIG. 3 does not constitute any limitation on the mobile phone, and the mobile phone 100 may include components more or fewer than those shown in the figure, or may include a combination of some components, or may include components disposed differently.

The following describes the components of the mobile phone 100 in detail with reference to FIG. 3.

The processor 101 is a control center of the mobile phone 100, and is connected to all parts of the mobile phone 100 by using various interfaces and lines. By running or executing an application program stored in the memory 103 and by invoking data stored in the memory 103, the processor 101 performs various functions of the mobile phone 100 and processes data. In some embodiments, the processor 101 may include one or more processing units. For example, the processor 101 may be a Kirin 960 chip fabricated by Huawei Technologies Co., Ltd. In some embodiments of this application, the processor 101 may further include a fingerprint verification chip, configured to verify a collected fingerprint.

The radio frequency circuit 102 may be configured to receive and send radio signals in an information receiving and sending process or in a call process. In particular, after receiving downlink data from a base station, the radio frequency circuit 102 may send the downlink data to the processor 101 for processing; and send related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further perform wireless communication with another device. Any communication standard or protocol may be used for the wireless communication, including but not limited to: global system for mobile communications, general packet radio service, code division multiple access, wideband code division multiple access, long term evolution, email, short message service, and the like.

The memory 103 is configured to store an application program and data. The processor 101 performs various functions of the mobile phone 100 and process data by running the application program and the data that are stored in the memory 103. The memory 103 mainly includes a program storage area and a data storage area. The program storage area may store an operating system and an application program required by at least one function (such as a voice playback function and an image playback function). The data storage area may store data (such as audio data and a phone book) created based on use of the mobile phone 100. In addition, the memory 103 may include a high-speed random access memory (RAM), or may include a nonvolatile memory such as a magnetic disk storage device, a flash memory device, or another volatile solid-state storage device. The memory 103 may store various operating systems, such as an iOS® operating system developed by Apple and an Android® operating system developed by Google. The memory 103 may be independent, and is connected to the processor 101 by using the communications buses. Alternatively, the memory 103 may be integrated with the processor 101.

The touchscreen 104 may specifically include a touchpad 104-1 and a display 104-2.

The touchpad 104-1 may collect a touch event performed by a user of the mobile phone 100 on or near the touchpad 104-1 (for example, an operation performed by the user on or near the touchpad 104-1 by using any proper object such as a finger or a stylus), and send collected touch information to another device (such as the processor 101). The touch event performed by the user near the touchpad 104-1 may be referred to as a floating touch. The floating touch may mean that the user does not need to directly touch the touchpad to select, move, or drag a target (for example, an icon), and the user only needs to be near the terminal to perform a desired function. In addition, the touchpad 104-1 may be implemented in a plurality of types such as a resistive type, a capacitive type, an infrared type, and a surface acoustic wave type.

The display (also referred to as a monitor) 104-2 may be configured to display information entered by the user or information provided for the user, and various menus of the mobile phone 100. The display 104-2 may be configured in a form of a liquid crystal display, an organic light-emitting diode, or the like. The touchpad 104-1 may cover the display 104-2. After detecting the touch event on or near the touchpad 104-1, the touchpad 104-1 transfers the touch event to the processor 101 to determine a type of the touch event. Then, the processor 101 may provide corresponding visual output on the display 104-2 based on the type of the touch event. Although the touchpad 104-1 and the display 104-2 in FIG. 3 serve as two independent components to implement input and output functions of the mobile phone 100, in some embodiments, the touchpad 104-1 and the display 104-2 may be integrated to implement the input and output functions of the mobile phone 100.

Figure 4A:
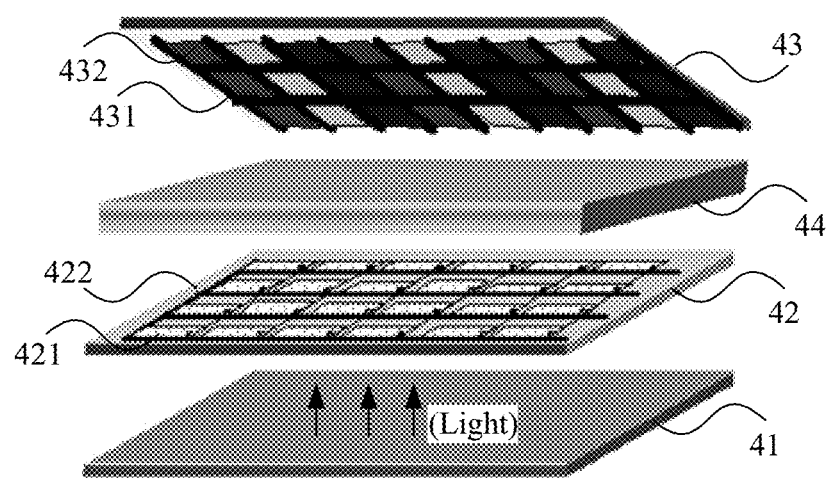
FIG. 4A is a schematic structural diagram 1 of a display according to an embodiment of this application.

For example, FIG. 4A is a schematic diagram of an internal structure of a display 104-2 according to an embodiment of this application. For example, an LCD (liquid crystal display) serves as the display 104-2. The display 104-2 mainly includes a backlight source 41, an array substrate (thin film transistor substrate) 42, a color filter substrate (color filter substrate) 43, and a liquid crystal molecular layer 44 packaged between the array substrate 42 and the color filter substrate 43.

Usually, still as shown in FIG. 4A, the array substrate 42 includes a plurality of rectangular array units obtained through division by gate lines 421 and data lines 422 that cross over each other. Under interaction between the gate lines 421 and the data lines 422 on the array substrate 42, each array unit may generate an electric field, to change a deflection angle and/or a deflection direction of a liquid crystal that is at the liquid crystal molecular layer 44 and that is corresponding to each array unit, thereby implementing an image display of the entire display 104-2.

The color filter substrate 43 is a key colorizing component of the display 104-2. After passing through the array substrate 42 and the liquid crystal molecular layer 44, light emitted by the backlight source 41 passes through the color filter substrate 43, and the color filter substrate 43 presents the light emitted by the backlight source 41 as a color image.

Still as shown in FIG. 4A, the color filter substrate 43 is usually fabricated by first forming, on a substrate, black matrices (BM) 431 that are arranged in a grid pattern. Each grid is corresponding to one array unit on the array substrate 42. Subsequently, color blocks 432 of colors, such as red (R), green (G), and blue (B), are arranged in order in the grids defined by the black matrices 431. In this way, the black matrices 431 can prevent the color blocks 432 in adjacent grids from encountering light leakage.

In this embodiment of this application, the color filter substrate 43 may be divided into a plurality of display units arranged in an array, and these display units are in a one-to-one correspondence with pixel units in the display 104-2. For example, in FIG. 4, an area formed by color blocks 432 of three primary colors including red, green, and blue and a black matrix 431 around the color blocks 432 may serve as a display unit. In cooperation with the liquid crystal molecular layer 44 and the array substrate 42, the display unit may serve as a minimum unit (namely, a pixel unit) that can independently display a color.

It should be noted that specific structures of the display unit and the pixel unit are not limited in this embodiment of this application. For example, a pixel unit may include a red subpixel unit, a green subpixel unit, and a blue subpixel unit. Alternatively, a pixel unit may further include a subpixel unit of a non-tricolor such as a white subpixel unit in addition to a red subpixel unit, a green subpixel unit, and a blue subpixel unit. In a display unit corresponding to each pixel unit, both the black matrix 431 and the color block 432 may be arranged according to a specific arrangement rule.

Figure 4B:
FIG. 4B is a schematic structural diagram 2 of a display according to an embodiment of this application.

In addition, FIG. 4B is a schematic structural top view of a display 104-2 according to an embodiment of this application. For the rectangular display 104-2, the display 104-2 usually includes four corner areas 45, and each corner area 45 is corresponding to a vertex of the display 104-2. In this embodiment of this application, by adjusting a light transmittance of each display unit corresponding to any corner area 45, a display effect of a jagged fillet in the corner area 45 can be ameliorated, thereby implementing smooth transition for the jagged fillet in hardware. For ease of description, in subsequent embodiments and accompanying drawings, the corner area 45 located in a lower left corner in FIG. 4B is used as an example to describe a color filter substrate and a display that are provided in the embodiments of this application.

It may be understood that the touchscreen 104 is formed by stacking a plurality of layers of materials. In the embodiments of this application, only a touchpad (layer) and a display (layer) are shown, and another layer is not recorded in the embodiments of this application. In addition, the touchpad 104-1 may be configured on the front facet of the mobile phone 100 in a form of a full panel, and the display 104-2 may also be configured on the front facet of the mobile phone 100 in a form of a full panel. In this way, a bezel-less structure can be implemented for the front facet of the mobile phone.

The mobile phone 100 may further include the Bluetooth apparatus 105, configured to implement data exchange between the mobile phone 100 and another terminal (such as a mobile phone or a smartwatch) over a short distance. In this embodiment of this application, the Bluetooth apparatus may be an integrated circuit, a Bluetooth chip, or the like.

The mobile phone 100 may further include at least one sensor 106, such as a fingerprint collection device 112, a light sensor, a motion sensor, and another sensor. Specifically, the fingerprint collection device 112 may be configured on the back facet of the mobile phone 100 (for example, below a rear-facing camera), or the fingerprint collection device 112 may be configured on the front facet of the mobile phone 100 (for example, below the touchscreen 104). For another example, the fingerprint collection device 112 may be configured in the touchscreen 104 to implement a fingerprint recognition function. In other words, the fingerprint collection device 112 may be integrated with the touchscreen 104 to implement the fingerprint recognition function of the mobile phone 100. The light sensor may include an ambient light sensor and a proximity sensor. The ambient light sensor may adjust luminance of the display of the touchscreen 104 based on brightness of ambient light. The proximity sensor may power off the display when the mobile phone 100 moves near an ear. As a type of motion sensor, an accelerometer sensor may detect acceleration magnitudes in all directions (usually in three axes), may detect a magnitude and a direction that are of gravity when the accelerometer sensor is stationary, and may be configured to recognize a posture application of the mobile phone (such as switching between a landscape mode and a portrait mode, a related game, or magnetometer posture calibration), a vibration related function (such as a pedometer and stroke), and the like. For other sensors that may be further configured for the mobile phone 100, such as a gyroscope, a barometer, a hygrometer, a thermometer, and an infrared sensor, details are not described herein.

The Wi-Fi apparatus 107 is configured to provide, for the mobile phone 100, network access that complies with a Wi-Fi related standard protocol. The mobile phone 100 may access a Wi-Fi access point by using the Wi-Fi apparatus 107, to help the user receive and send emails, browse a web page, access streaming media, and the like. The Wi-Fi apparatus 107 provides wireless broadband Internet access for the user. In some other embodiments, the Wi-Fi apparatus 107 may serve as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as a global positioning system (GPS), a BeiDou navigation satellite system, or a Russian GLONASS. After receiving a geographic location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisted server to assist the positioning apparatus 108 in completing ranging and positioning services. In this case, the assisted positioning server communicates, through a wireless communications network, with the positioning apparatus 108 (namely, a GPS receiver) of the terminal such as the mobile phone 100 and provides positioning assistance. In some other embodiments, the positioning apparatus 108 may alternatively be a positioning technology based on a Wi-Fi access point. Each Wi-Fi access point has a globally unique media access control (MAC) address, and the terminal with Wi-Fi enabled can scan and collect a broadcast signal of a surrounding Wi-Fi access point. Therefore, the terminal can obtain a MAC address broadcast by the Wi-Fi access point. The terminal sends, to a location server through a wireless communications network, such data (for example, the MAC address) that can identify the Wi-Fi access point. The location server retrieves a geographic location of each Wi-Fi access point, calculates a geographic location of the terminal with reference to strength of the Wi-Fi broadcast signal, and sends the geographic location of the terminal to the positioning apparatus 108 of the terminal.

The audio circuit 109, a loudspeaker 113, and a microphone 114 may provide an audio interface between the user and the mobile phone 100. The audio circuit 109 may transmit, to the loudspeaker 113, an electrical signal that is obtained through conversion of received audio data, and the loudspeaker 113 converts the electrical signal into a sound signal and outputs the sound signal. In another aspect, the microphone 114 converts a collected sound signal into an electrical signal, and the audio circuit 109 receives the electrical signal, converts the electrical signal into audio data, and then outputs the audio data to the RF circuit 102 to send the audio data to, for example, another mobile phone, or outputs the audio data to the memory 103 for further processing.

The peripheral interface 110 is configured to provide various interfaces for an external input/output device (such as a keyboard, a mouse, an external display, an external memory, or a subscriber identity module card). For example, the terminal is connected to the mouse by using a universal serial bus (USB) interface, and the terminal is connected, by using a metal contact in a card slot of a subscriber identity module card, to a subscriber identity module (SIM) card provided by a telecom operator. The peripheral interface 110 may be configured to couple the external input/output peripheral device to the processor 101 and the memory 103.

The mobile phone 100 may further include a power supply apparatus 111 (for example, a battery and a power management chip) that supplies power to each component. The battery may be logically connected to the processor 101 by using the power management chip, so that functions such as charging management, discharging management, and power consumption management are implemented by using the power supply apparatus 111.

The mobile phone 100 may further include a camera (a front-facing camera and/or a rear-facing camera), a flash, a micro projection apparatus, a near field communication (NFC) apparatus, and the like, although they are not shown in FIG. 3. Details are not described herein.

In an embodiment of this application, when a vertex of a display 104-2 needs to present a display effect of a fillet, to ameliorate a jagged display effect on an edge of the fillet, before a color filter substrate 43 of the display 104-2 is fabricated, a fillet monochrome rendering diagram of a specified size may be first drawn based on a fillet effect required by the display 104-2.

Figure 5:
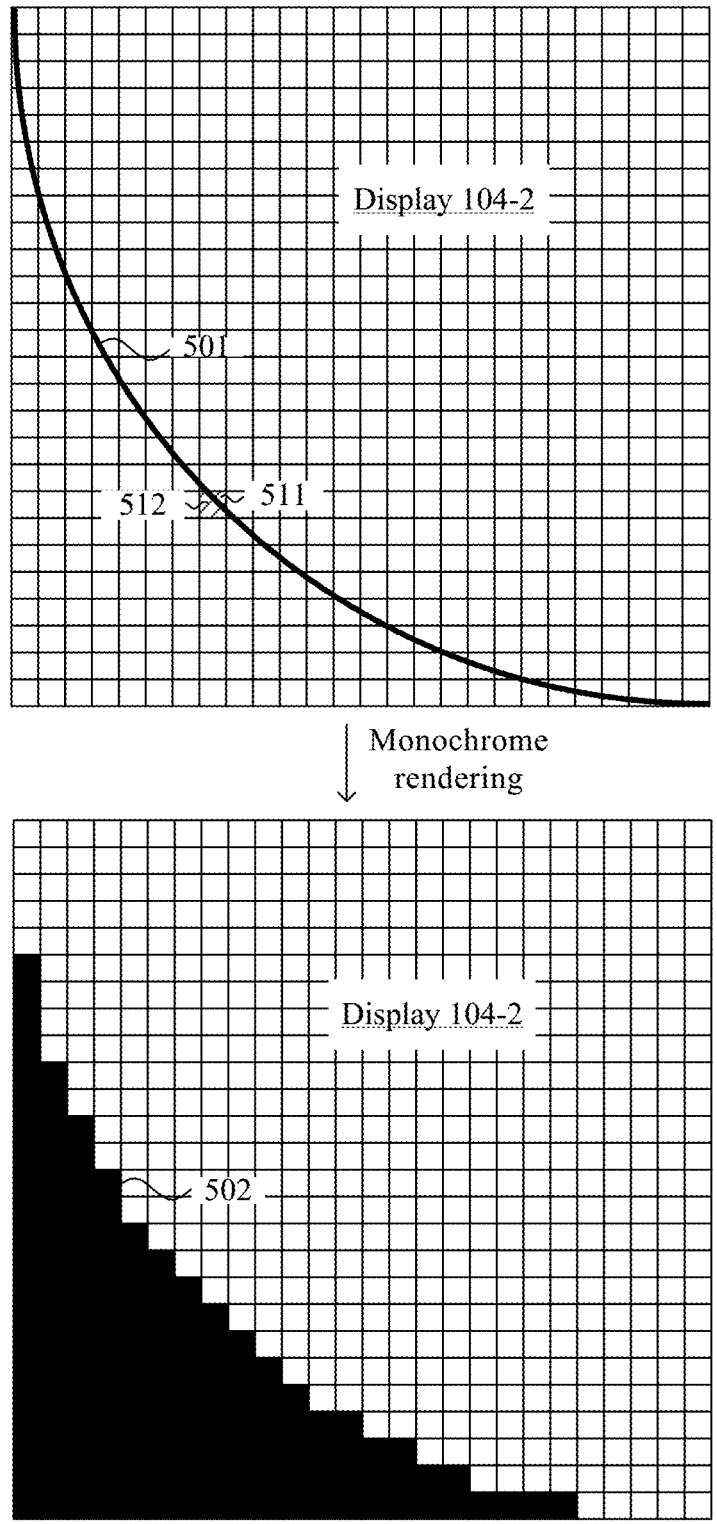
FIG. 5 is a schematic diagram 1 of an application scenario of displaying a fillet according to an embodiment of this application.

For example, the fillet effect required by the display 104-2 is a ¼ target arc having a radius of 26 display units. As shown in FIG. 5, monochrome rendering is performed on a smooth target arc 501. The target arc 501 divides each display unit that the target arc 501 passes through into two parts. For example, a display unit A in FIG. 5 is divided into a first part 511 close to the display 104-2 and a second part 512 away from the display 104-2.

When an area of a part (for example, the first part 511) close to the display 104-2 is greater than half of an area of a complete display unit, this pixel unit may be reserved for the display 104-2. When an area of a part close to the display 104-2 is less than or equal to half of an area of a complete display unit, this pixel unit may be removed from the display 104-2.

Still as shown in FIG. 5, according to the foregoing rule, a fillet monochrome rendering diagram of the target arc 501 can be obtained after monochrome rendering is performed. Black rectangular blocks in FIG. 5 are display units, in the display 104-2, that are not displayed (these display units that are not displayed may be reserved in the display 104-2, or may be removed during fabrication of the display 104-2, that is, may not be included in the display 104-2). In this case, the target arc 501 has been rendered as a first arc 502 that is unsmooth. Apparently, the first arc 502 obtained after monochrome rendering is performed presents an apparent jagged display effect.

Figure 6:
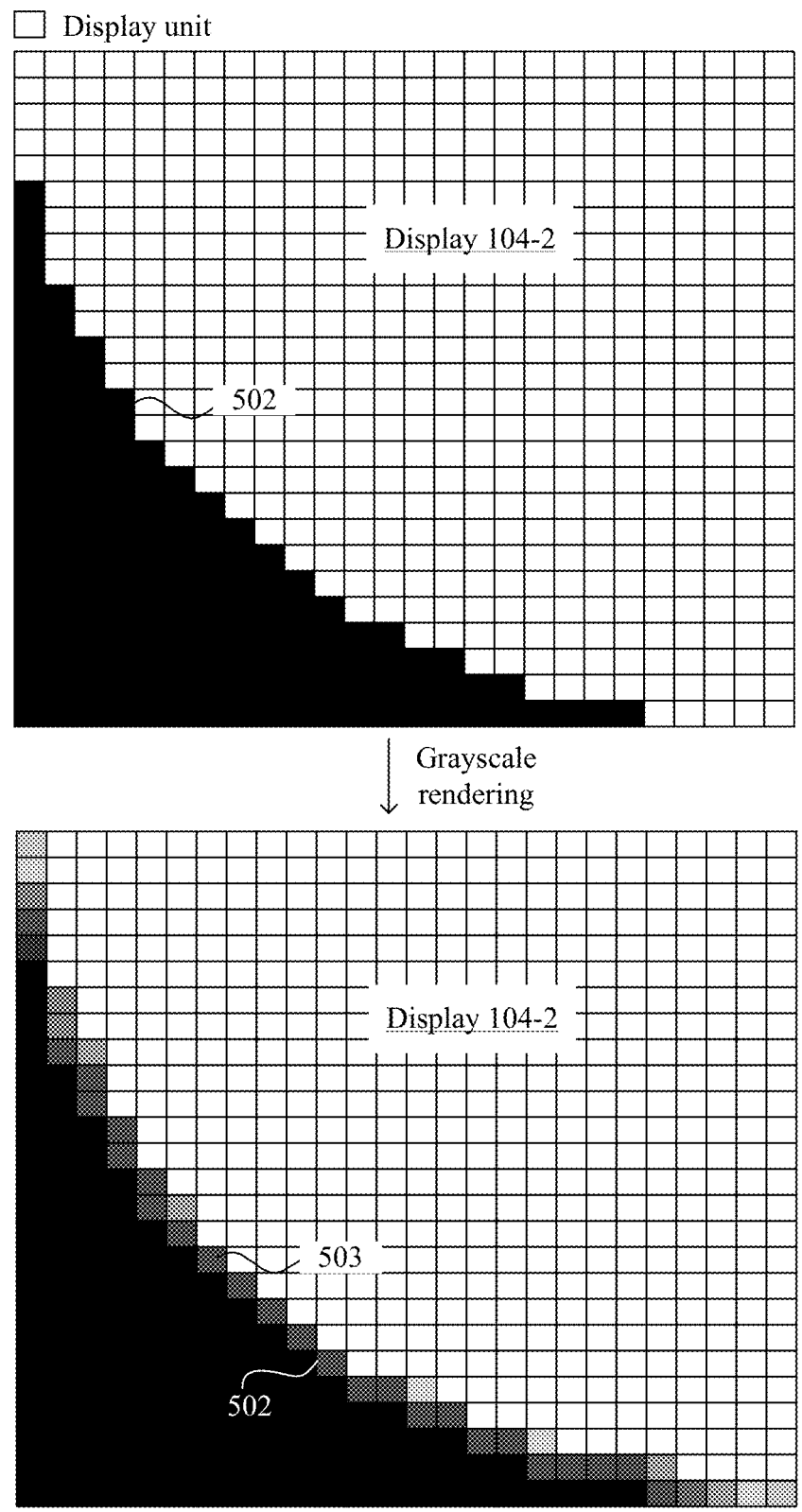
FIG. 6 is a schematic diagram 2 of an application scenario of displaying a fillet according to an embodiment of this application.

To ameliorate the jagged display effect on the edge of the fillet, gray-scale rendering may be performed on the fillet monochrome rendering diagram that is obtained after monochrome rendering is performed. As shown in FIG. 6, the first arc 502 that is unsmooth is adjusted to a second arc 503 having a relatively smooth display effect. In this case, the second arc 503 obtained after gray-scale rendering is performed is distributed like a ribbon along the first arc 502, and a ribbon area including K (K≥2) display units is formed. In this case, the jagged first arc 502 is a target boundary line that is in the ribbon area and that is away from the display 104-2. The ribbon area includes two boundary lines. One boundary line is away from the center of the display 104-2, and the other boundary line is close to the center of the display 104-2. The target boundary line is the boundary line away from the center of the display 104-2.

For any two display units in the ribbon area, for example, a first display unit close to the target boundary line and a second display unit farther away from the target boundary line than the first display unit, a gray scale value of the first display unit is less than a gray scale value of the second display unit.

Still as shown in FIG. 6, gray-scale rendering may be performed on the fillet monochrome rendering diagram by using a preset gray-scale rendering algorithm or image processing software (for example, Photoshop), to adjust luminance of display units near an outline (namely, the first arc 502) in the fillet monochrome rendering diagram and obtain the second arc 503 having a relatively smooth display effect, thereby implementing a visual effect of gradient luminance. It can be learned that, during gray-scale rendering, dark-to-bright gradient processing is performed on the jagged first arc 502, so that the first arc 502 originally in the rigid jagged shape becomes softer and a smoother fillet effect is implemented.

A gray scale value of a display unit may be used to reflect luminance of the display unit (for example, a pixel unit or a subpixel unit). Specifically, luminance between maximum luminance and minimum luminance may be divided into one or more levels. An 8-bit (bit) display is used as an example. Luminance may be divided into 0 to 255, that is, 256 (namely, the eighth power of 2) luminance levels in total. In other words, the gray scale value may be adjusted within a range from 0 to 255. A gray scale value of 0 indicates the minimum luminance, and in this case, black is presented; and a gray scale value of 255 indicates the maximum luminance, and in this case white is presented.

Figure 1:
FIG. 1 is a schematic diagram 1 of a scenario of displaying a fillet in the prior art.
Figure 2:
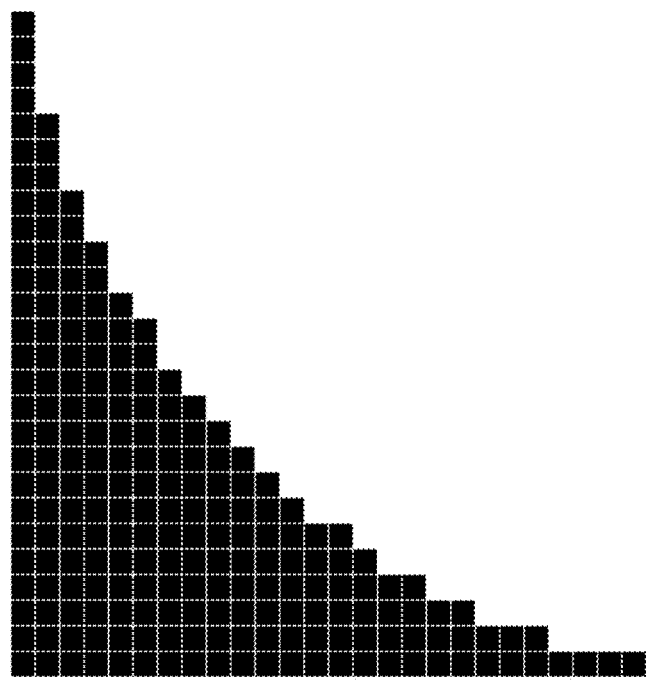
FIG. 2 is a schematic diagram 2 of a scenario of displaying a fillet in the prior art.

Therefore, during gray-scale rendering, actually, gray scale values transition from 0 to 255 along the first arc 502 according to a specific gray-scale rendering rule. FIG. 7A-1 and FIG. 7A-2 are gray-scale distribution diagrams of a gray-scale rendering diagram obtained after gray-scale rendering in FIG. 6 is performed. It can be learned that, in a target direction in which the first arc 502 (namely, a boundary line whose gray scale value is 0 in FIG. 7A-1 and FIG. 7A-2) spreads towards the center of the first arc 502, for display units within a specific range, a display unit closer to the first arc 502 obtains a smaller gray scale value after rendering is performed, and a display unit farther away from the first arc 502 obtains a larger gray scale value after rendering is performed.

Figure 7B:
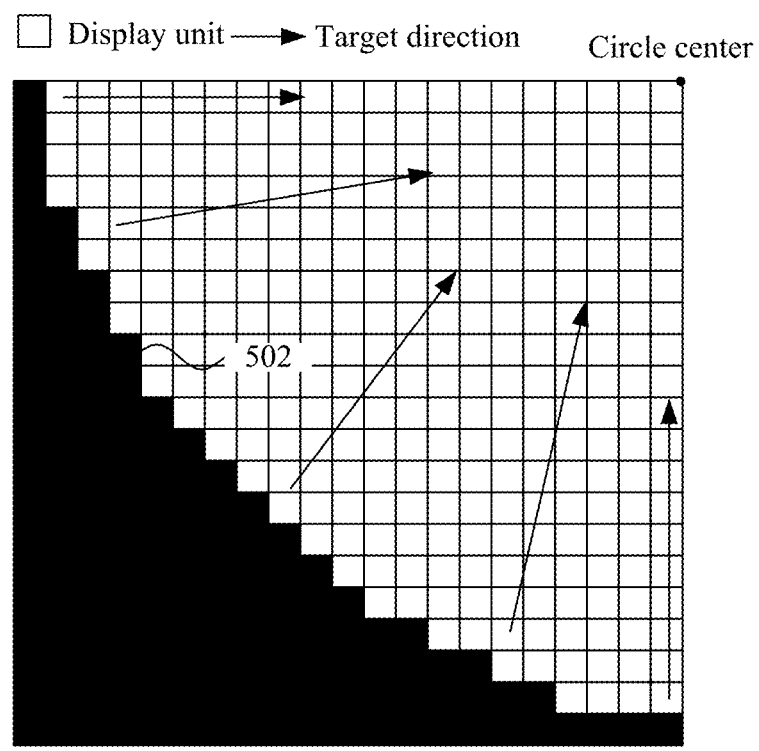
FIG. 7B is a schematic diagram 4 of an application scenario of displaying a fillet according to an embodiment of this application.

As shown in FIG. 7B, the target direction in which the first arc 502 spreads towards the center of the first arc 502 may specifically include a direction from any point on the first arc 502 to the center of the first arc 502. A direction that is along each column of the display units (namely, a y axis of a rectangular coordinate system) and that points to the center of the first arc 502, or a direction that is along each row of the display units (namely, an x axis of the rectangular coordinate system) and that points to the center of the first arc 502 may be considered as the direction in which the first arc 502 spreads towards the center of the first arc 502.

For example, still as shown in FIG. 7A-1 and FIG. 7A-2, for display units in any column (or any row), gray scale values of the display units transition from 0 to 255 after gray-scale rendering is performed. A display unit farther away from the first arc 502 obtains a larger gray scale value after rendering is performed, and a display unit closer to the first arc 502 obtains a smaller gray scale value after rendering is performed.

In addition, in any two columns or two rows of the display units (for example, a row 1 and a row 2 in FIG. 7A-1 and FIG. 7A-2), a quantity of display units whose gray scale values are in an open interval (0, 255) in one column or row may be equal or not equal to that in the other column or row. For example, gray scale values of display units in the row 1 transition from 0 to 220, and then transition from 220 to 255 in the target direction. In this case, there is only one display unit (whose gray scale value is 220) whose gray scale value is in (0, 255). Gray scale values of display units in the row 2 transition from 0 to 63, next transition from 63 to 151, then transition from 151 to 220, and finally transition from 220 to 255 in the target direction. In this case, there are six display units (including four display units whose gray scale values are 63, one display unit whose gray scale value is 151, and one display unit whose gray scale value is 220) whose gray scale values are in (0, 255). The open interval (0, 255) excludes two endpoints: 0 and 255.

Figure 8:
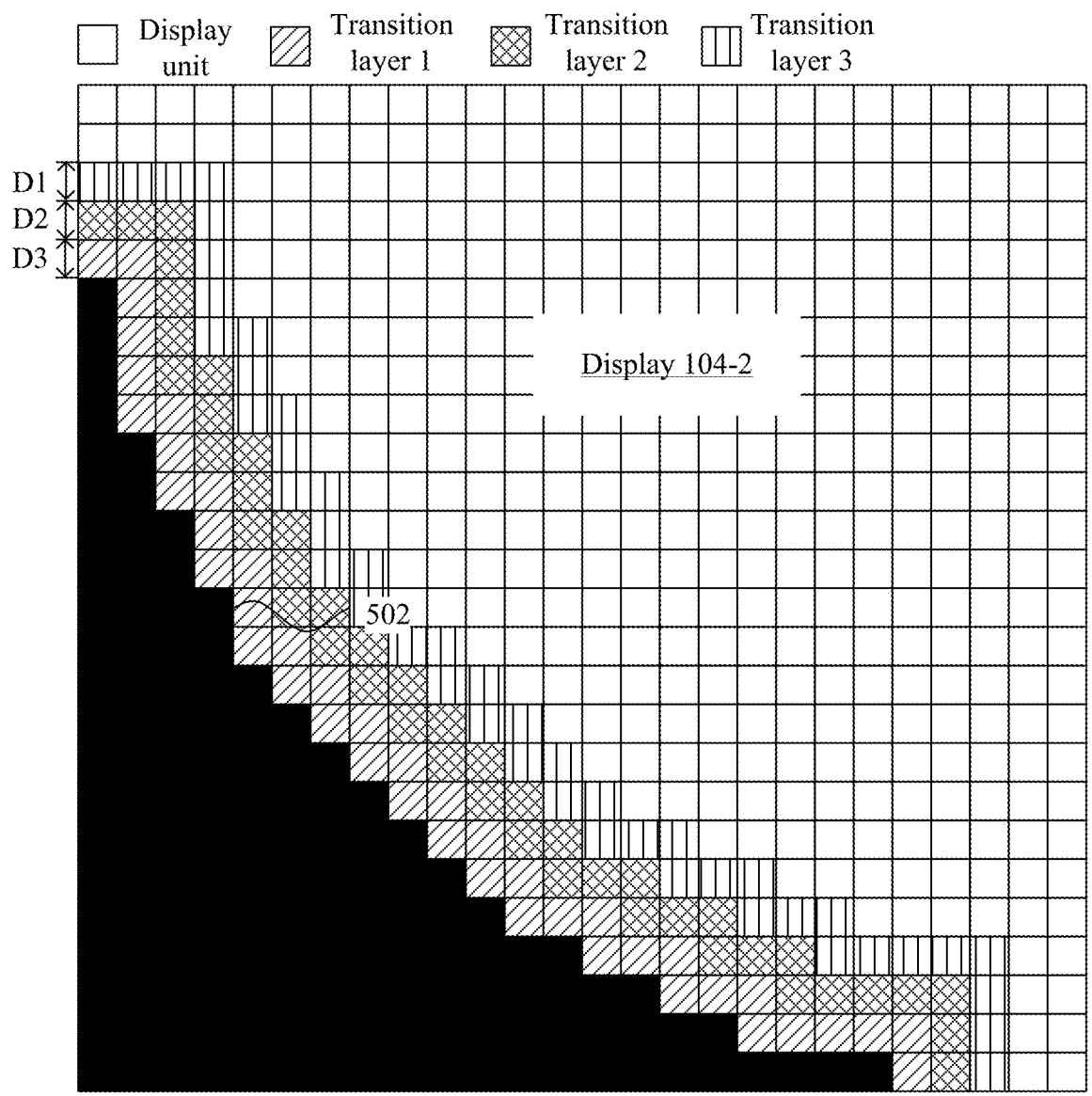
FIG. 8 is a schematic diagram 5 of an application scenario of displaying a fillet according to an embodiment of this application.

In one embodiment, Q (Q≥1) transition layers formed by display units may be set in the ribbon area that uses the first arc 502 (namely, a boundary line of black rectangular blocks in FIG. 6) as the target boundary line. As shown in FIG. 8, for example, if Q=3, in the direction in which the first arc 502 spreads towards the center of the first arc 502, the following transition layers are included: a transition layer 1 closest to the first arc 502, a transition layer 3 farthest away from the first arc 502, and a transition layer 2 between the transition layer 1 and the transition layer 3. In this case, during gray-scale rendering, it may be set that a gray scale value of each display unit at the transition layer 2 is greater than a gray scale value of each display unit at the transition layer 1 and is less than a gray scale value of each display unit at the transition layer 3.

In this case, still as shown in FIG. 8, in a direction that is along the x axis (or the y axis) and that is away from the first arc 502, gray scale values of display units in each row (or each column) gradually increase. In other words, gray-scale rendering is performed on the first arc 502 in each row (or each column) of the pixel units in the display, so that the first arc 502 becomes softer, and a smoother fillet effect is implemented.

For example, gray scale values 0 to 255 may be divided into N (N>1) gray scale levels. For example, according to a principle of fourths, the gray scale values 0 to 255 are divided into four gray scale levels in total: 63, 127, 191, and 255, and in an ascending order of the gray scale levels, 63, 127, and 191 are sequentially set as gray scale values of all display units at the transition layers 1 to 3.

Therefore, when gray-scale rendering is performed on the first arc 502, as shown in FIG. 9A and FIG. 9B, in the direction in which the first arc 502 spreads towards the center of the first arc 502, gray scale values of display units at the transition layer 1 closest to the first arc 502 may be set to 63, gray scale values of display units at the transition layer 2 on the periphery of the transition layer 1 may be set to 127, gray scale values of display units at the transition layer 3 farthest away from the first arc 502 may be set to 191, and gray scale values of the other display units outside the transition layer 3 are all 255, to obtain the smooth second arc 503 that gradually transitions from a gray scale value 0 to a gray scale value 255 along the first arc 502.

In other words, the gray scale values of the display units at the transition layers 1 to 3 may be sequentially distributed in an arithmetic progression. In this case, light transmittances of each of the transition layers 1 to 3 are also distributed in an arithmetic progression or in an approximate arithmetic progression, so that the first arc 502 can present a smoother transition during gray-scale rendering. In a specific implementation process, the gray scale values of the display units at the transition layers 1 to 3 may be also approximately distributed in an arithmetic progression. For example, the gray scale values corresponding to the display units at the transition layers 1 to 3 may include but are not limited to any one of the following groups: 63, 127, and 190; 63, 128, and 190; 63, 128, and 191; 64, 127, and 191; 64, 127, and 190; 64, 128, and 191; and so on.

When only one transition layer is disposed on the periphery of the first arc 502, gray scale values of display units at the transition layer may be set to the median among 0 to 255, that is, 127. In this case, gray scale values of display units on a side that is of the transition layer and that is away from the center of the first arc 502 are 0, and gray scale values of display units on a side that is of the transition layer and that is close to the center of the first arc 502 is 255. Apparently, 0, 127, and 255 are also approximately distributed in an arithmetic progression. Certainly, a gray scale value of the transition layer may be alternatively set to another value close to 127, such as 128 or 126.

In addition, as shown in FIG. 8, a thickness D1 of the transition layer 1, a thickness D2 of the transition layer 2, and a thickness D3 of the transition layer 3 may be set to be equal, to improve evenness of gray-scale rendering and make the second arc 503 obtained after gray-scale rendering is performed smoother. A thickness of each transition layer may be a quantity of display units included at the transition layer in a direction of the x axis (or the y axis).

It should be noted that, because the transition layer is stepped, for a transition layer, in some places of the transition layer, a thickness of the transition layer is a quantity of display units included at the transition layer in the direction of the x axis, and in other places of the transition layer, a thickness of the transition layer is a quantity of display units included at the transition layer in the direction of the y axis. As shown in FIG. 8, a thickness of each of the transition layers 1 to 3 is a thickness of one display unit.

In one embodiment of this application, a fillet of the display 104-2 may be fabricated based on the gray-scale rendering diagram obtained after gray-scale rendering is performed, to obtain a fillet having a smoother display effect and ameliorate the jagged display effect.

The gray-scale distribution diagrams shown in FIG. 7A-1 and FIG. 7A-2 are still used as an example. A smaller gray scale value of a display unit indicates a smaller light transmittance of the display unit. Oppositely, a larger gray scale value of a display unit indicates a larger light transmittance of the display unit.

A light transmittance (transmittance) is a ratio of transmitted radiant energy projected onto an object to total radiant energy projected onto the object in a process in which incident light flux passes from a lighting surface or an incident surface of a medium to the other surface, and is one of important indicators for evaluating display quality of a terminal.

For example, when a gray scale value is 0, a display unit corresponding to the gray scale value has minimum luminance, that is, light is totally not transmitted. In this case, a light transmittance of the display unit may be set to: 0/255=0. When a gray scale value is 255, a display unit corresponding to the gray scale value has maximum luminance, that is, light is totally transmitted. In this case, a light transmittance of the display unit may be set to: 255/255=1. When a gray scale value is 127, a display unit corresponding to the gray scale value has medium luminance. In this case, a light transmittance of the display unit may be set to: 127/255≈0.5.

In this way, a gray scale value of each pixel unit in the gray-scale distribution diagrams shown in FIG. 7A-1 and FIG. 7A-2 (or FIG. 9A and FIG. 9B) may be converted into a corresponding light transmittance. Using a light transmittance distribution diagram of a target fillet shown in FIG. 10 as an example, it can be learned that after monochrome rendering and gray-scale rendering are performed, each display unit close to the jagged first arc 502 has a relatively small light transmittance, and each display unit away from the jagged first arc 502 has a relatively large light transmittance, to implement a smooth fillet display effect.

Therefore, during fabrication of the target fillet of the display 104-2, a light transmittance of a corresponding display unit may be modified based on the light transmittance distribution diagram shown in FIG. 10, to eliminate a jagged effect at each fillet of the display 104-2.

For example, a display area of each display unit in the color filter substrate may be adjusted to adjust a light transmittance of the display unit. Light cannot pass through a black matrix in a display unit, and light can pass through a color block in the display unit. Therefore, a size ratio of the color block to the black matrix in the display unit may be changed to adjust a light transmittance of the display unit.

Figure 11:
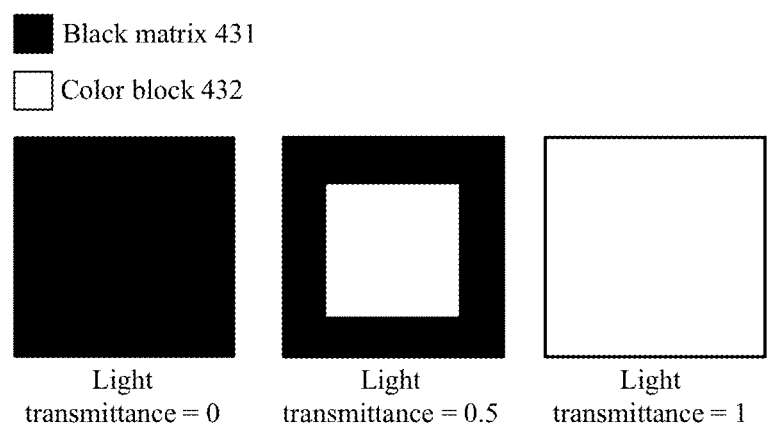
FIG. 11 is a schematic diagram 8 of an application scenario of displaying a fillet according to an embodiment of this application.

As shown in FIG. 11, when a light transmittance of a display unit is 0, a size ratio of a color block to a black matrix in the display unit may be set to 0:1, that is, the display unit is all filled with the black matrix; when a light transmittance of a display unit is 0.5, a size ratio of a color block to a black matrix in the display unit may be set to 1:1, that is, half of an area of the display unit is used to be filled with the black matrix, and the other half of the area is used to be filled with the color block; and when a light transmittance of a display unit is 1, a size ratio of a color block to a black matrix in the display unit may be set to 1:0, that is, the display unit is all filled with the color block.

It should be noted that, in this embodiment of this application, the black matrices 431 of different sizes in each display unit are black matrices other than black matrices that are disposed between the display units and that are used to prevent light leakage from occurring between pixels. Still as shown in FIG. 11, when a light transmittance of a display unit is 1, the display unit is not filled with the black matrix 431, but the black matrices in a grid pattern used to prevent light leakage from occurring between pixels may still be formed between the display unit and an adjacent display unit based on an existing pixel structure.

Figure 12:
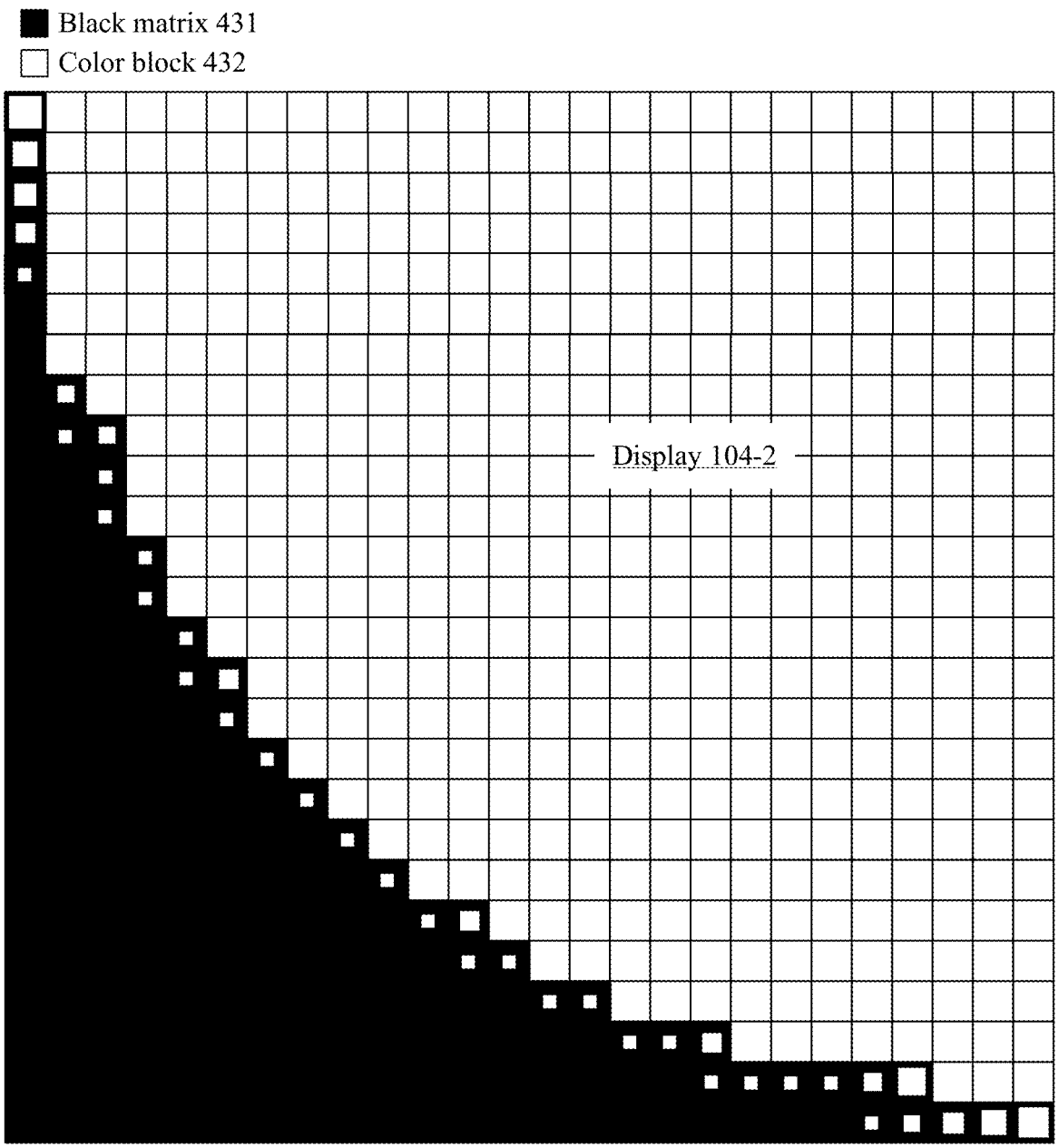
FIG. 12 is a schematic diagram 9 of an application scenario of displaying a fillet according to an embodiment of this application.

Therefore, during fabrication of a color filter substrate, a size ratio of a color block 432 to a black matrix 431 in a corresponding display unit may be determined based on a light transmittance of each display unit in the light transmittance distribution diagram shown in FIG. 10, to obtain the color filter substrate. As shown in FIG. 12, in the obtained color filter substrate, in a direction in which an edge of a jagged fillet spreads to the center of the edge, areas of color blocks 432 in display units gradually increase, and sizes of black matrices 431 in the display units gradually decrease, so that display areas of the display units in the direction gradually increase. In this way, in a display process, gray scale values of display units in each row or each column along the edge of the jagged fillet transition from 0 to 255. In other words, a display unit farther away from the edge of the jagged fillet has a larger gray scale value, and a display unit closer to the edge of the jagged fillet has a smaller gray scale value.

In other words, in the display 104-2 that is fabricated by using the foregoing color filter substrate, each display unit in the color filter substrate corresponding to a corner area of the display 104-2 is fabricated based on a light transmittance obtained after gray-scale rendering is performed. Therefore, when the display 104-2 performs displaying, the corner area of the display 104-2 may present a display effect, shown in FIG. 6, obtained after gray-scale rendering is performed. In this case, the jagged fillet obtained after gray-scale rendering is performed transitions by using display units that are in the ribbon area and whose gray scale values are changed, so that the fillet originally in the rigid jagged shape becomes visually softer, thereby ameliorating the jagged display effect and improving display quality of the display.

When vertices of the display 104-2 are in a form of a fillet, the foregoing corner area is an area, of a specific size, that is in the display 104-2 and that is set with a fillet of the display 104-2 being an edge. In this case, all display units in the corner area may be used for display. When vertices of the display 104-2 are in a form of a right angle, the foregoing corner area is an area, of a specific size, that is in the display 104-2 and that can display a fillet effect. In this case, some display units in the corner area do not perform displaying.

Figure 13:
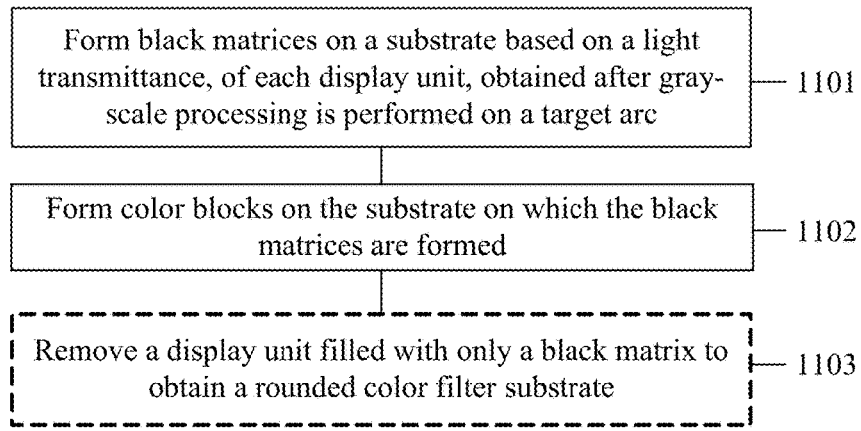
FIG. 13 is a schematic flowchart of a method for fabricating a color filter substrate according to an embodiment of this application.

The following describes in detail a method for fabricating a color filter substrate provided in an embodiment of this application with reference to specific embodiments. As shown in FIG. 13, for example, a color filter substrate corresponding to a corner area of a display is fabricated. The method includes the following operations.

Operation 1101: Form black matrices on a substrate based on a light transmittance, of each display unit, obtained after gray-scale processing is performed on a target arc.

Figure 14:
FIG. 14 is a schematic structural diagram 1 of a color filter substrate according to an embodiment of this application.

As shown in FIG. 14, black matrices 1202 may be fabricated on a substrate 1201 by still using an existing mask process and by using means such as coating, etching, developing and exposing. However, a difference lies in that during fabrication of the black matrices 1202, the black matrices 1202 in different display units have different areas in a light emitting direction of the display.

Figure 15:
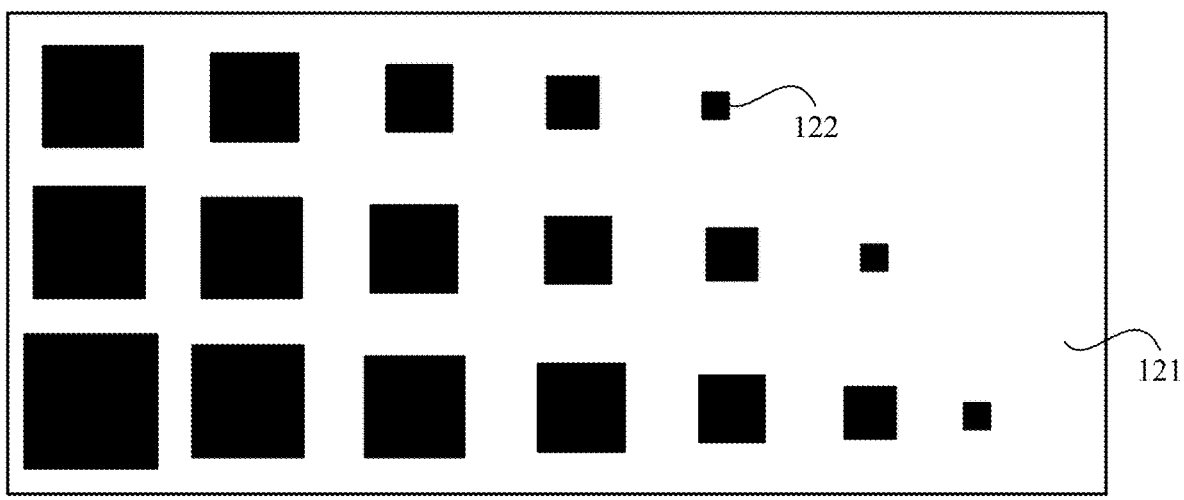
FIG. 15 is a schematic structural diagram 2 of a color filter substrate according to an embodiment of this application.

Specifically, a mask 1203 may be fabricated according to a light transmittance distribution diagram of the target arc shown in FIG. 10. For example, as shown in FIG. 15, the mask 1203 includes a transmission area 121 and a plurality of occlusion areas 122, and each occlusion area 122 is corresponding to one display unit. When the display unit has a relatively large light transmittance, the corresponding occlusion area 122 has a smaller size. When the display unit has a relatively small light transmittance, the corresponding occlusion area 122 has a larger size.

Figure 16:
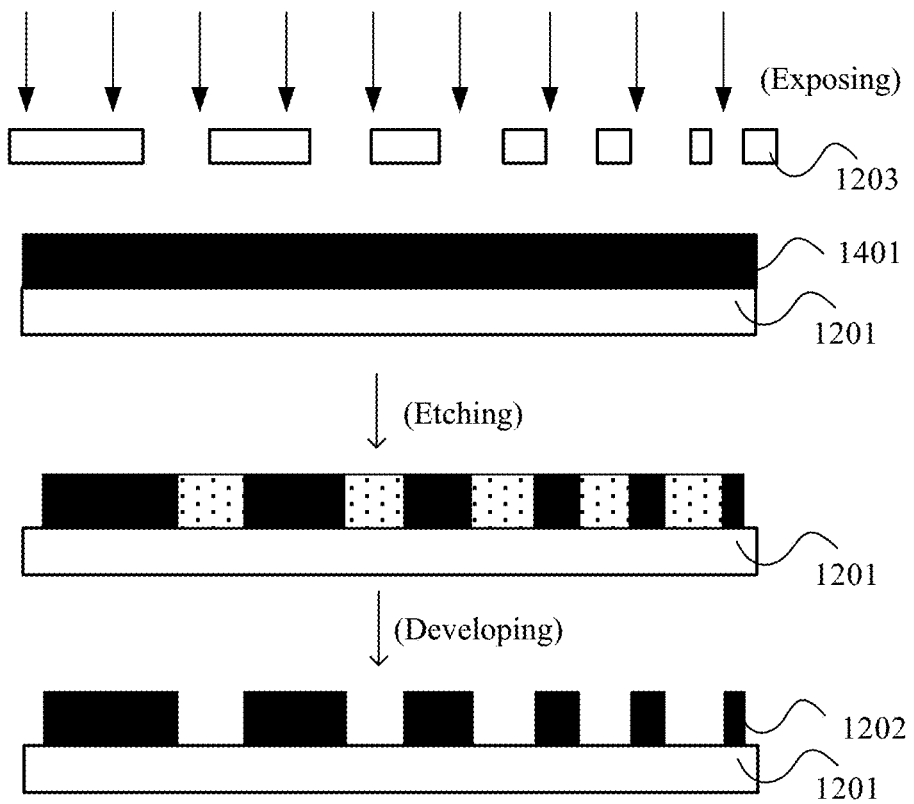
FIG. 16 is a schematic structural diagram 3 of a color filter substrate according to an embodiment of this application.

In this way, as shown in FIG. 16, after the substrate 1201 is coated with a black matrix material 1401, the black matrix material 1401 may be exposed by using the mask 1203. A part that is exposed and that is of the black matrix material 1401 generates a photochemical reaction, and dissolves in etching solution in an etching process. After a developing process is performed, black matrices 1202 in a grid pattern may be obtained. An area of a black matrix 1202 in each display unit is corresponding to a distribution diagram of a light transmittance of each display unit in FIG. 10.

Figure 17:
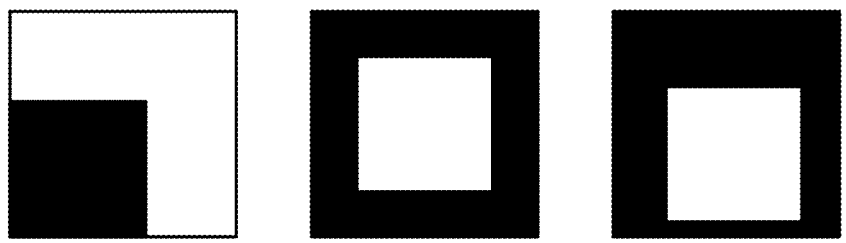
FIG. 17 is a schematic structural diagram 4 of a color filter substrate according to an embodiment of this application.

Certainly, a specific shape and a location that are of the black matrix 1202 in each display unit are not limited in this embodiment of this application. As shown in FIG. 17, black matrices 1202 in display units may be symmetrically or asymmetrically distributed in the display units, which is not limited in this embodiment of this application.

Operation 1102: Form color blocks on the substrate on which the black matrices are formed.

Figure 18:
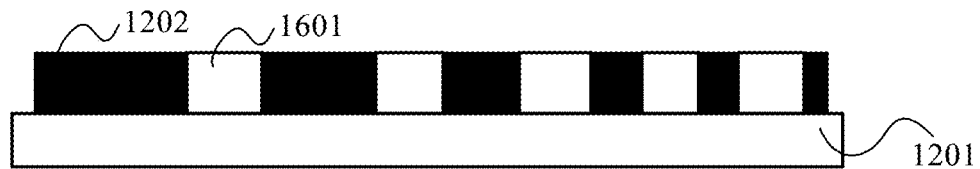
FIG. 18 is a schematic structural diagram 5 of a color filter substrate according to an embodiment of this application.

As shown in FIG. 18, after the black matrices 1202 are formed on the substrate 1201, a color block 1601 may be filled in a gap formed by the black matrices 1202 by also using the mask process, to form the color filter substrate shown in FIG. 12. The color block 1601 may be at least one of a red block, a blue block, a green block, and a white block.

Figure 19:
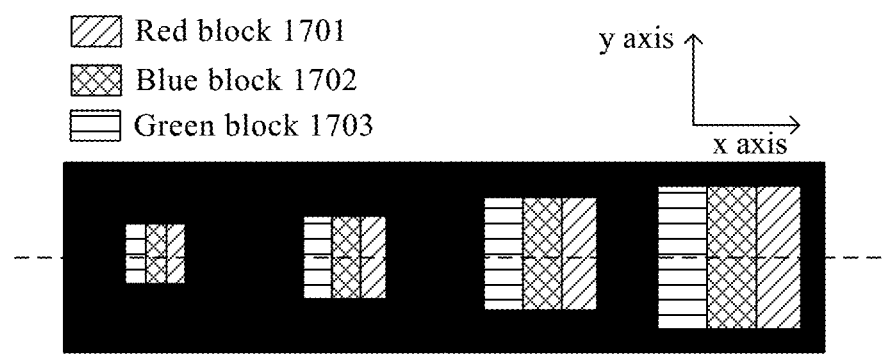
FIG. 19 is a schematic structural diagram 6 of a color filter substrate according to an embodiment of this application.

As shown in FIG. 19, a display unit may include color blocks of three primary colors: a red block 1701, a blue block 1702, and a green block 1703. In one embodiment, areas of the three types of color blocks filled in the gap formed by the black matrices 1202 may be set to be equal, to avoid an abnormal display of colors, because the color blocks of the three primary colors have different areas, after the three primary colors are mixed.

In one embodiment, still as shown in FIG. 19, it may be further set that both color blocks and a black matrix in each display unit are symmetrically disposed along an x axis in each row (and/or a y axis in each row). When color blocks and black matrices in display units in each row are symmetrically disposed along the x axis, and color blocks and black matrices in display units in each column are symmetrically disposed along the y axis, the color blocks in each display unit are located in the center of the display unit. In this way, color uniformity can be improved in a subsequent display process of the display units.

Figure 20:
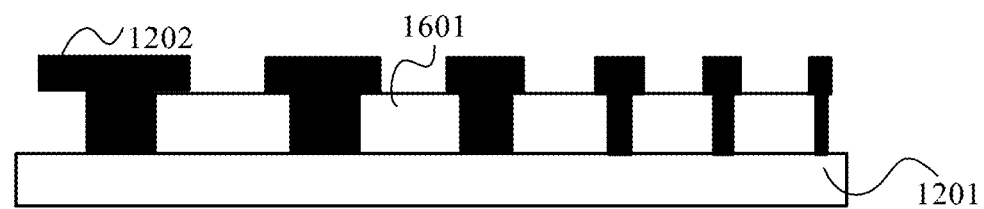
FIG. 20 is a schematic structural diagram 7 of a color filter substrate according to an embodiment of this application.

Alternatively, as shown in FIG. 20, a black matrix 1202 may be fabricated into a T shape. In this case, the black matrix 1202 may cover a part of the color block 1601. However, an area ratio of the black matrix 1202 to the color block 1601 in the light emitting direction is still corresponding to the light transmittance distribution diagram of the target arc shown in FIG. 10.

In other words, when an area ratio of a black matrix 1202 to a color block 1601 in a display unit in the light emitting direction is corresponding to a light transmittance of the display unit after gray-scale processing is performed, the color filter substrate can present a relatively smooth fillet display effect shown in FIG. 6. Therefore, a specific manner of disposing a black matrix and a color block in each display unit of the color filter substrate is not limited in this embodiment of this application.

In the color filter substrate fabricated by performing operations 1101 and 1102, a display area of each display unit on an edge of a jagged fillet may be changed by changing an area ratio of black matrices to color blocks in each corner area in the color filter substrate. Therefore, a gray-scale rendering effect of the jagged fillet is implemented in hardware, a jagged display effect of a rounded display can be greatly ameliorated without increasing power consumption of a terminal, and smooth transition for the jagged fillet is implemented.

Operation 1103: Remove a display unit filled with only a black matrix to obtain a rounded color filter substrate (optional).

The fabricated color filter substrate and an array substrate are subsequently meshed to form a display. If the rounded display is subsequently required to be installed in a mobile phone module, a display unit filled with only a black matrix 1202 in the color filter substrate shown in FIG. 12 may be alternatively removed, to obtain a rounded color filter substrate.

Certainly, because the display unit filled with only the black matrix 1202 does not have a display function, the color filter substrate in a right angle form formed in operation 1102 may alternatively be directly fabricated into a display. In this case, although the display is in the right angle form, because a display area of each display unit on the edge of the jagged fillet in the color filter substrate is adjusted based on a gray-scale rendering result, the display can still present a relatively smooth fillet display effect in an actual display.

A color filter substrate shown in FIG. 12 may be fabricated by performing the foregoing operations 1101 to 1103. Display units in the color filter substrate are in a one-to-one correspondence with pixel units in any corner area of the display.

In addition, during fabrication of the color filter substrate, sizes of both a black matrix and a color block in each display unit are determined based on a light transmittance of each display unit obtained after gray-scale rendering shown in FIG. 6 is performed. Therefore, similar to FIG. 6, the fabricated color filter substrate also includes a ribbon area including K (K≥2) display units, and a target boundary line that is of the ribbon area and that is away from the center of the color filter substrate is jagged.

For any two display units in the ribbon area in the color filter substrate, for example, a first display unit close to the target boundary line and a second display unit farther away from the target boundary line than the first display unit, a light transmittance of the first display unit is less than a light transmittance of the second display unit (the light transmittance of the first display unit is greater than 0). In other words, dark-to-bright gradient processing is performed on a jagged fillet, so that an arc originally in a rigid jagged shape becomes visually softer, and a smoother fillet effect is implemented.

Further, the first display unit and the second display unit may be any two display units located in a same column or a same row in the ribbon area. In other words, the target boundary line may be used as a start point, and light transmittances of display units in each column (or each row) in the ribbon area gradually increase, to implement soft transition of the jagged target boundary line.

In one embodiment, the ribbon area may include Q (Q≥2) transition layers disposed along the target boundary line. In this case, similar to FIG. 8, a display unit at a transition layer (for example, a first transition layer) close to the jagged target boundary line is the first display unit having a relatively small light transmittance, a display unit at a second transition layer farther away from the jagged target boundary line than the first transition layer is the second display unit having a relatively large light transmittance. In this way, in the ribbon area, light transmittances of display units at the layers along the target boundary line may smoothly transition from 0 to 1 layer-by-layer.

Each of the Q transition layers may have a same thickness, so that light transmittances change more evenly, and the ribbon area has a smoother display effect.

In addition, display units at any one of the Q transition layers have a same light transmittance. In this case, the Q transition layers are corresponding to Q light transmittances, and the Q light transmittances may be distributed in an arithmetic progression. Therefore, the jagged target boundary line can present a smoother transition during a display.

It should be noted that, as shown in FIG. 7A-1 and FIG. 7A-2, in any two columns (or any two rows) during gray-scale rendering, a quantity of display units whose gray scale values vary in (0, 255) in one column (or one row) may be equal or not equal to that in the other column (or the other row). Therefore, in the color filter substrate fabricated based on the gray-scale rendering result, in any two columns (or any two rows), a quantity of display units whose light transmittances vary in (0, 1) in one column (or one row) may also be equal or not equal to that in the other column (or the other row). An open interval (0, 1) excludes two endpoints: 0 and 1.

In the foregoing embodiments, an example in which the ribbon area in the color filter substrate includes the first display unit and the second display unit is used for description. It may be understood that the ribbon area may further include a third display unit (the third display unit is farther away from the jagged target boundary line than the second display unit). In this case, to make the jagged target boundary line smoother during a display, a light transmittance of the third display unit may be set to be greater than the light transmittance of the second display unit. In other words, the following relationship exists: Light transmittance of the third display unit>Light transmittance of the second display unit>Light transmittance of the first display unit.

A light transmittance of a display unit is determined based on an area ratio of a black matrix to a color block in the display unit. When a display unit has a larger area ratio of a black matrix to a color block, the display unit has a smaller light transmittance. Therefore, in a light emitting direction of the color filter substrate, an area ratio of a black matrix to a color block in the first display unit is greater than an area ratio of a black matrix to a color block in the second display unit. In the light emitting direction of the color filter substrate, the area ratio of a black matrix to a color block in the second display unit is greater than an area ratio of a black matrix to a color block in the third display unit.

As shown in FIG. 18, the black matrix and the color block may be disposed at a same layer. Alternatively, as shown in FIG. 20, the black matrix may cover the color block.

As shown in FIG. 19, in one embodiment, color blocks of different colors in each display unit have a same area.

In one embodiment, in the ribbon area, a color block and a black matrix in each display unit in each row of the display units may be symmetrically disposed along the x axis. Alternatively, in the ribbon area, a color block and a black matrix in each display unit in each row of the display units may be symmetrically disposed along the y axis. The color block is symmetrical with respect to the x axis or the y axis as a whole. As shown in FIG. 19, when a color block and a black matrix in each display unit in each column of the display units are symmetrically disposed along the x axis, and a color block and a black matrix in each display unit in each column of the display units are symmetrically disposed along the y axis, the color block in each display unit is located in the center of the display unit.

In some embodiments of this application, according to gray-scale distribution diagrams shown in FIG. 7A-1 and FIG. 7A-2, the terminal may alternatively implement the fillet display effect of the display 104-2 at a software layer by bringing a layer on top.

Figure 21:
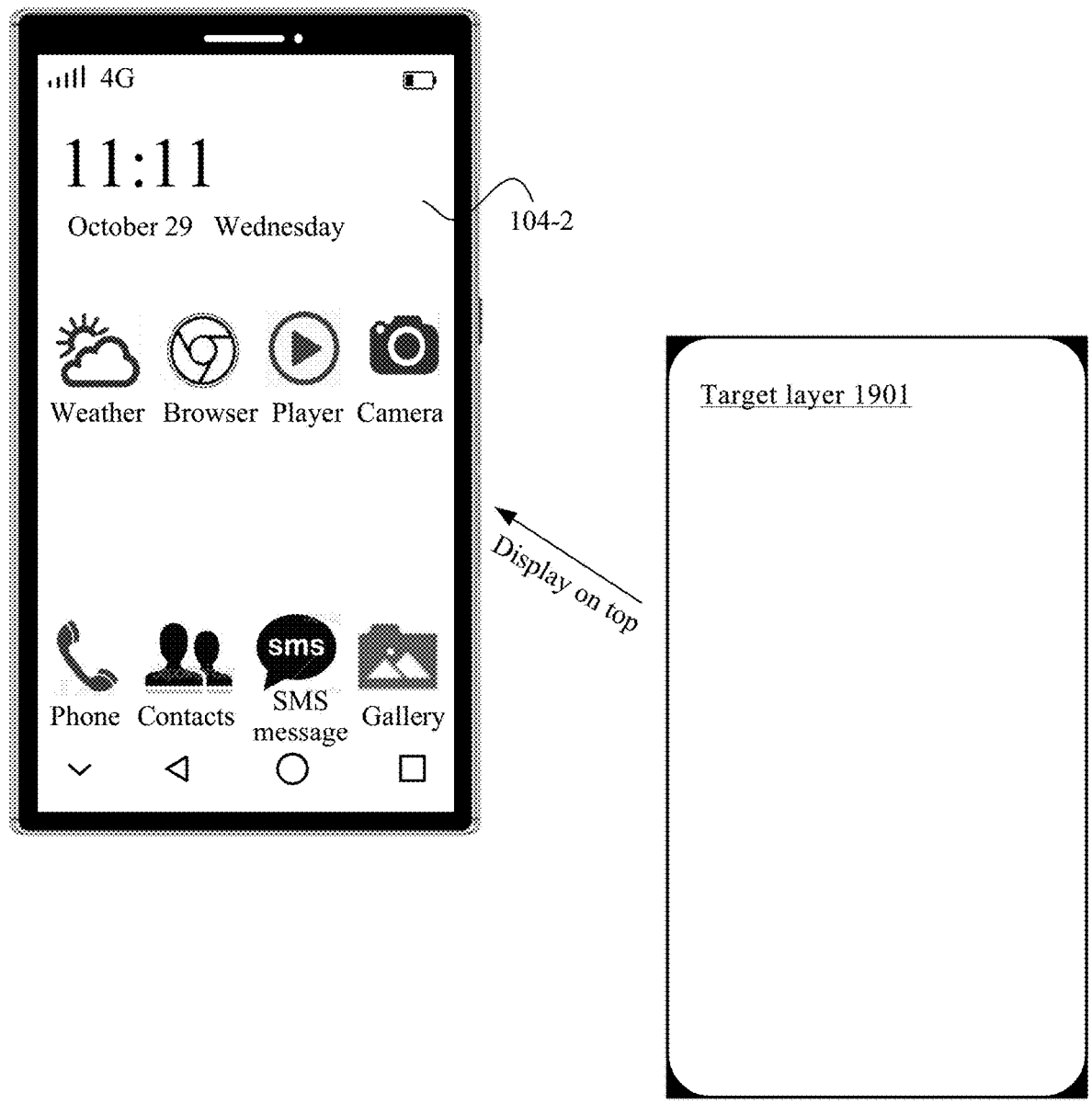
FIG. 21 is a schematic diagram 10 of an application scenario of displaying a fillet according to an embodiment of this application.

For example, as shown in FIG. 21, the display 104-2 of the terminal is in a right angle form, and monochrome rendering and gray-scale rendering may be performed on a target fillet based on a size of the display 104-2 and a fillet effect required by the display 104-2, to obtain the gray-scale distribution diagrams shown in FIG. 7A-1 and FIG. 7A-2 (FIG. 7A-1 and FIG. 7A-2 show one fillet of the display 104-2). Further, the terminal may set a gray scale value of each display unit in the display 104-2 according to the gray-scale distribution diagrams shown in FIG. 7A-1 and FIG. 7A-2 to obtain a target layer 1901.

The formed target layer 1901 is shown in FIG. 6. In a direction in which the target fillet (namely, a boundary line whose gray scale value is 0 in FIG. 7A-1 and FIG. 7A-2) spreads towards the center of the target fillet, a display unit farther away from the target fillet has a larger gray scale value after rendering is performed, and a display unit closer to the target fillet has a smaller gray scale value after rendering is performed, thereby implementing a visual effect of luminance being gradient at the fillet and obtaining a smoother fillet effect.

In this case, the terminal may store the formed target layer 1901 into a memory, and display the target layer 1901 on a top layer of a current display interface when displaying each display interface, that is, display the target layer 1901 on top. Therefore, a relatively smooth fillet display effect is presented in each fillet area of the display 104-2.

Figure 22:
FIG. 22 is a schematic diagram 11 of an application scenario of displaying a fillet according to an embodiment of this application.

Alternatively, as shown in FIG. 22, if the display 104-2 of the terminal is in a fillet form, to ameliorate a jagged display effect on an edge of a fillet, similar to FIG. 21, the terminal may perform gray-scale rendering on a target fillet based on a size of the fillet of the display 104-2. In this case, different from FIG. 7, an obtained gray-scale distribution diagram does not include a display unit whose gray scale value is 0. Further, the terminal may still set a gray scale value of each display unit in the display 104-2 according to the gray-scale distribution diagram obtained after gray-scale rendering is performed, to obtain a target layer 1901, and display the target layer 1901 on top in a current display interface, thereby implementing a smoother fillet effect.

Figure 23:
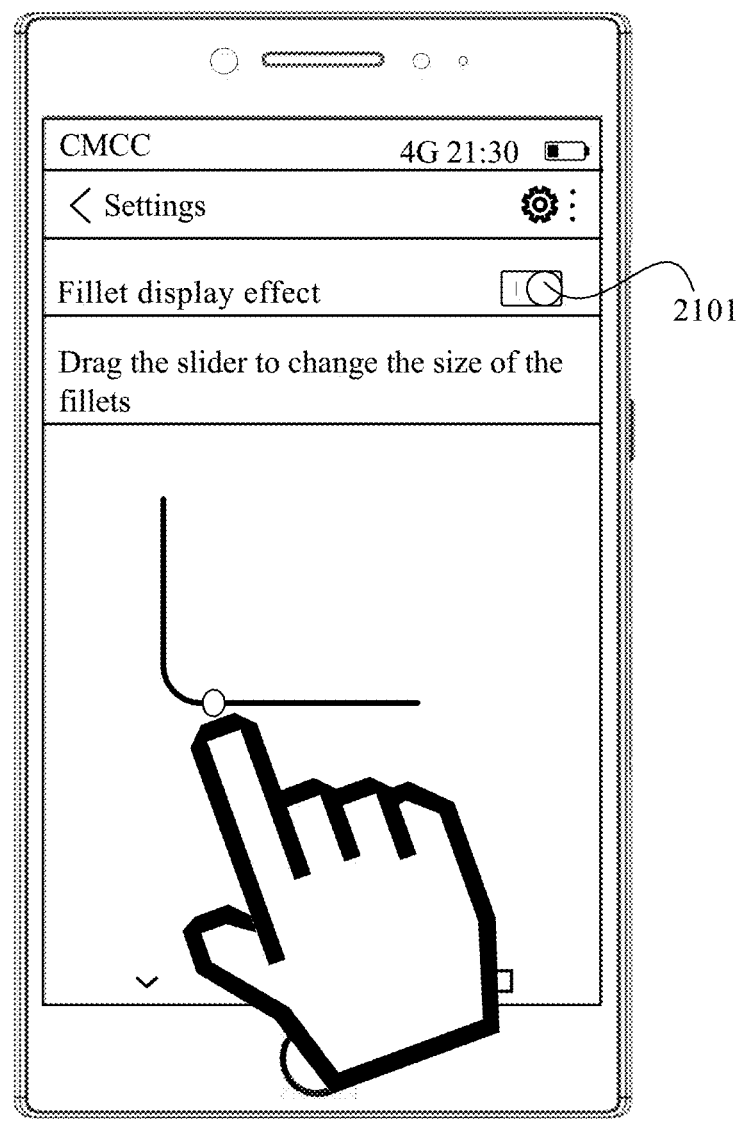
FIG. 23 is a schematic diagram 12 of an application scenario of displaying a fillet according to an embodiment of this application.

In addition, as shown in FIG. 23, a user may further enable or disable a fillet display effect option 2101 in a setting interface. In addition, when enabling a fillet display effect, the user may further adjust a fillet parameter such as a radius of a fillet when the display 104-2 performs a fillet display. In this way, the terminal may generate a corresponding target layer based on the user-defined fillet parameter and according to a method shown in FIG. 22 or FIG. 23, and display the target layer on top in a display interface of the display 104-2, to implement a customized fillet display effect.

Further, an embodiment of the present application further provides a terminal. A display of the terminal includes the color filter substrate provided in the foregoing embodiments. The terminal may be specifically any product or component having a display function, such as a liquid crystal panel, an e-paper, a mobile phone, a tablet computer, a television, a display, a notebook computer, a digital photo frame, or a navigation instrument. For example, when the terminal is a mobile phone, for a specific hardware structure of the terminal, refer to the mobile phone 100 shown in FIG. 3.

It may be understood that, to implement the foregoing functions, the terminal and the like include corresponding hardware structures and/or software modules for performing the functions. A person skilled in the art should easily be aware that units and algorithm operations in the examples described with reference to the embodiments disclosed in this specification can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions described in the embodiments of this application are completely or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display, comprising:
    an array substrate;
    a color filter substrate including a plurality of display units that are in a one-to-one correspondence with pixels in the display; and
    a liquid crystal layer packaged between the array substrate and the color filter substrate;
    wherein at least one corner area in the display is shaped as an arc, and comprises a ribbon area distributed along a target boundary line that is away from a center of the color filter substrate and that is jagged;
    wherein the ribbon area comprises two or more transition layers, wherein each of the two or more transition layers corresponds to a set of display units disposed along the target boundary line, on a side of the center of the color filter substrate, and from one end of the target boundary line to another end of the target boundary line, wherein each display unit that is on the side of the center of the color filter substrate and that is not on the ribbon area has a same first light transmittance, and wherein each display unit that is on the other side of the center of the color filter substrate and that is not on the ribbon area is transparent and has a same second light transmittance that is smaller than the first light transmittance, wherein the set of display units corresponding to each of the two or more transition layers have a same light transmittance that is between the first light transmittance and the second light transmittance; and
    wherein each of the display units in the ribbon area comprises a plurality of color blocks and a black matrix that encloses the plurality of color blocks.

2. The display according to claim 1, wherein the ribbon area includes a first display unit and a second display unit that are in a same column or a same row of the plurality of display units, wherein the second display unit is farther away from the target boundary line than the first display unit, wherein a light transmittance of the first display unit is less than a light transmittance of the second display unit, and wherein the light transmittance of the first display unit is greater than 0.

3. The display according to claim 1, wherein each of the two or more transition layers has a same thickness.

4. The display according to claim 1, wherein the light transmittances in the two or more transition layers are distributed in an approximate arithmetic progression towards the center of the color filter substrate by a predetermined value.

5. The display according to claim 1, wherein light transmittances of the plurality of display units of the at least one corner area are in a one-to-one correspondence with gray scale values of the plurality of display units, wherein the gray scale values of the plurality of display units are obtained by gray-scale rendering on a monochrome rendering diagram that is obtained by monochrome rendering on the arc, wherein the gray scale values of the sets of display units at the two or more transition layers are distributed in an approximate arithmetic progression.

6. The display according to claim 2, wherein the ribbon area further comprises a third display unit, the third display unit is farther away from the target boundary line than the second display unit, and a light transmittance of the third display unit is greater than the light transmittance of the second display unit.

7. The display according to claim 1, wherein in the ribbon area,
    in any two columns of the plurality of display units, a quantity of display units whose light transmittances are any value in (0, 1) in one column is equal or not equal to that in the other column; or
    in any two rows of the plurality of display units, a quantity of display units whose light transmittances are any value in (0, 1) in one row is equal or not equal to that in the other row.

8. The display according to claim 2, wherein in a light emitting direction of the color filter substrate, a first area ratio of a black matrix to a color block of the plurality of color blocks in the first display unit is larger than a second ratio of a black matrix to a color block of the plurality of color blocks in the second display unit; and
    wherein the first display unit that has the larger area ratio has a smaller light transmittance.

9. The display according to claim 8, wherein the black matrix and the color block are disposed at a same layer; or the black matrix covers the color block.

10. The display according to claim 9, wherein color blocks of different colors in each display unit have a same area.

11. The display according to claim 8, wherein in the ribbon area,
    both the plurality of color blocks and the black matrix in each display unit in each row of the plurality of display units are symmetrically disposed along an x axis; or
    both the plurality of color blocks and the black matrix in each display unit in each column of the plurality of display units are symmetrically disposed along a y axis.

12. A terminal, wherein the terminal comprises:
    a processor;
    a display, wherein the display is coupled to the processor, and comprises an array substrate, a color filter substrate including a plurality of display units that are in a one-to-one correspondence with pixels in the display, and a liquid crystal layer packaged between the array substrate and the color filter substrate;

a memory coupled to the processor and storing one or more computer programs, which when executed by the processor, cause the terminal to perform operations comprising:

displaying at least one corner area in the display, wherein the at least one corner area is shaped as an arc, and comprises a ribbon area distributed along a target boundary line that is away from a center of the color filter substrate and that is jagged, wherein the ribbon area comprises two or more transition layers, wherein each of the two or more transition layers corresponds to a set of display units disposed along the target boundary line, on a side of the center of the color filter substrate, and from one end of the target boundary line to another end of the target boundary line, wherein each display unit that is on the side of the center of the color filter substrate and that is not on the ribbon area has a same first light transmittance, and wherein each display unit that is on the other side of the center of the color filter substrate and that is not on the ribbon area is transparent and has a same second light transmittance that is smaller than the first light transmittance; and displaying a same light transmittance between the first light transmittance and the second light transmittance in each of the set of display units in each of the two or more transition layers, wherein each of the display units in the ribbon area comprises a plurality of color blocks and a black matrix that encloses the plurality of color blocks.

13. The terminal according to claim 12, wherein the ribbon area includes a first display unit and a second display unit that are in a same column or a same row of the plurality of display units, wherein the second display unit is farther away from the target boundary line than the first display unit, wherein a light transmittance of the first display unit is less than a light transmittance of the second display unit, and wherein the light transmittance of the first display unit is greater than 0.

14. The terminal according to claim 12, wherein each of the two or more transition layers has a same thickness.

15. The terminal according to claim 12, wherein the light transmittances in the sets of display units of the two or more transition layers are distributed in an approximate arithmetic progression towards the center of the color filter substrate by a predetermined value.

16. The terminal according to claim 12, wherein light transmittances of the plurality of display units of the at least one corner area are in a one-to-one correspondence with gray scale values of the plurality of display units, wherein the gray scale values of the plurality of display units are obtained by gray-scale rendering on a monochrome rendering diagram that is obtained by monochrome rendering on the arc, wherein the gray scale values of the sets of display units at the two or more transition layers are distributed in an approximate arithmetic progression.

17. The terminal according to claim 13, wherein the ribbon area further comprises a third display unit, the third display unit is farther away from the target boundary line than the second display unit, and a light transmittance of the third display unit is greater than the light transmittance of the second display unit.

18. The terminal according to claim 12, wherein in the ribbon area, in any two columns of the plurality of display units, a quantity of display units whose light transmittances are any value in (0, 1) in one column is equal or not equal to that in the other column; or in any two rows of the plurality of display units, a quantity of display units whose light transmittances are any value in (0, 1) in one row is equal or not equal to that in the other row.

19. The terminal according to claim 13, wherein in a light emitting direction of the color filter substrate, a first area ratio of a black matrix to a color block of the plurality of color blocks in the first display unit is larger than a second ratio of a black matrix to a color block of the plurality of color blocks in the second display unit; and wherein the first display unit that has the larger area ratio has a smaller light transmittance.

20. The terminal according to claim 19, wherein the black matrix and the color block are disposed at a same layer; or the black matrix covers the color block.

21. The display according to claim 1, wherein a corresponding size ratio of each of the plurality of color blocks in the display unit to the black matrix is adjusted based on a corresponding light transmittance of the display unit, wherein the corresponding size ratio is set to a ratio 0:1 for the display unit to be all filled with the black matrix, to a ratio 1:1 for half of an area of the display unit to be filled with the black matrix, or to a ratio of 1:0 for the display unit to be all filled with the color block.

* * * * *